(12) United States Patent
Tamura

(10) Patent No.: US 8,368,931 B2
(45) Date of Patent: Feb. 5, 2013

(54) IMAGE FORMING APPARATUS, METHOD OF CONTROLLING THE SAME, PROGRAM, AND STORAGE MEDIUM

(75) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 12/576,081

(22) Filed: Oct. 8, 2009

(65) Prior Publication Data

US 2010/0091327 A1    Apr. 15, 2010

(30) Foreign Application Priority Data

Oct. 14, 2008  (JP) .................................. 2008-265709

(51) Int. Cl.
G06F 15/00 (2006.01)
(52) U.S. Cl. ........................................ 358/1.15; 399/82
(58) Field of Classification Search .................. 358/1.15
See application file for complete search history.

(56) References Cited

U.S. PATENT DOCUMENTS

2007/0250535 A1*  10/2007  Morikawa et al. .......... 707/104.1
2009/0059274 A1*   3/2009  Tomita .......................... 358/1.15

FOREIGN PATENT DOCUMENTS

JP         2004-287860         1/2004

* cited by examiner

Primary Examiner — Saeid Ebrahimi Dehkordy
(74) Attorney, Agent, or Firm — Fitzpatrick, Cella, Harper & Scinto

(57) ABSTRACT

An image forming apparatus capable of defining each of a plurality of executable functions as one work item and executing a plurality of workflows each combining the work items includes a setting change reception unit which receives a setting change for a setting item of a work item that constitutes a preprocess workflow and reflects the contents of the setting change on an associated setting item of a work item that constitutes a post-process workflow, a data generation unit which generates data including the execution result of the preprocess workflow and the contents of the setting change, an analysis unit which analyzes, based on the generated data, whether a setting change has been done for the setting item of the work item that constitutes the post-process workflow, and a workflow execution unit which controls execution of the post-process workflow based on the analysis result.

14 Claims, 38 Drawing Sheets

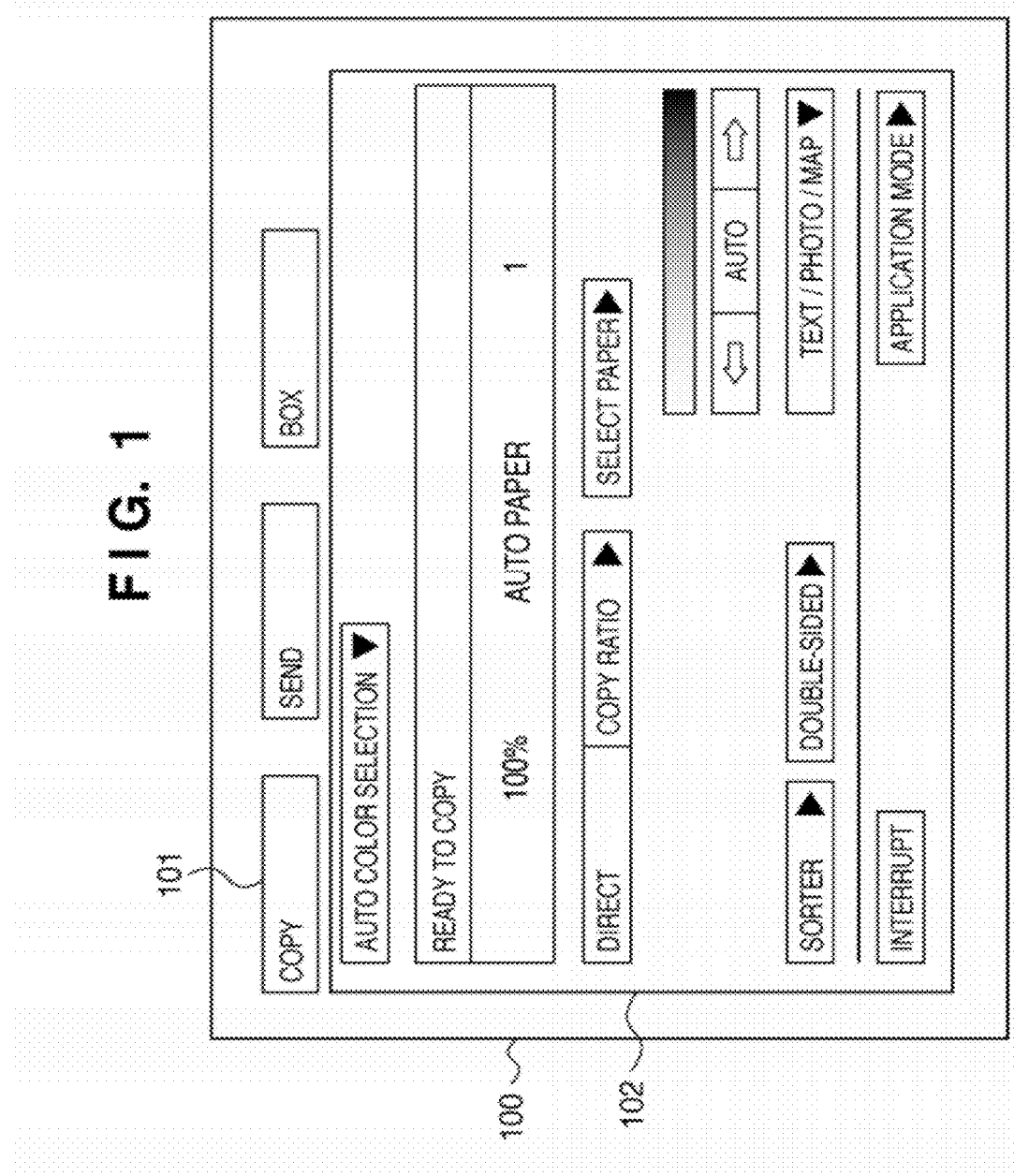

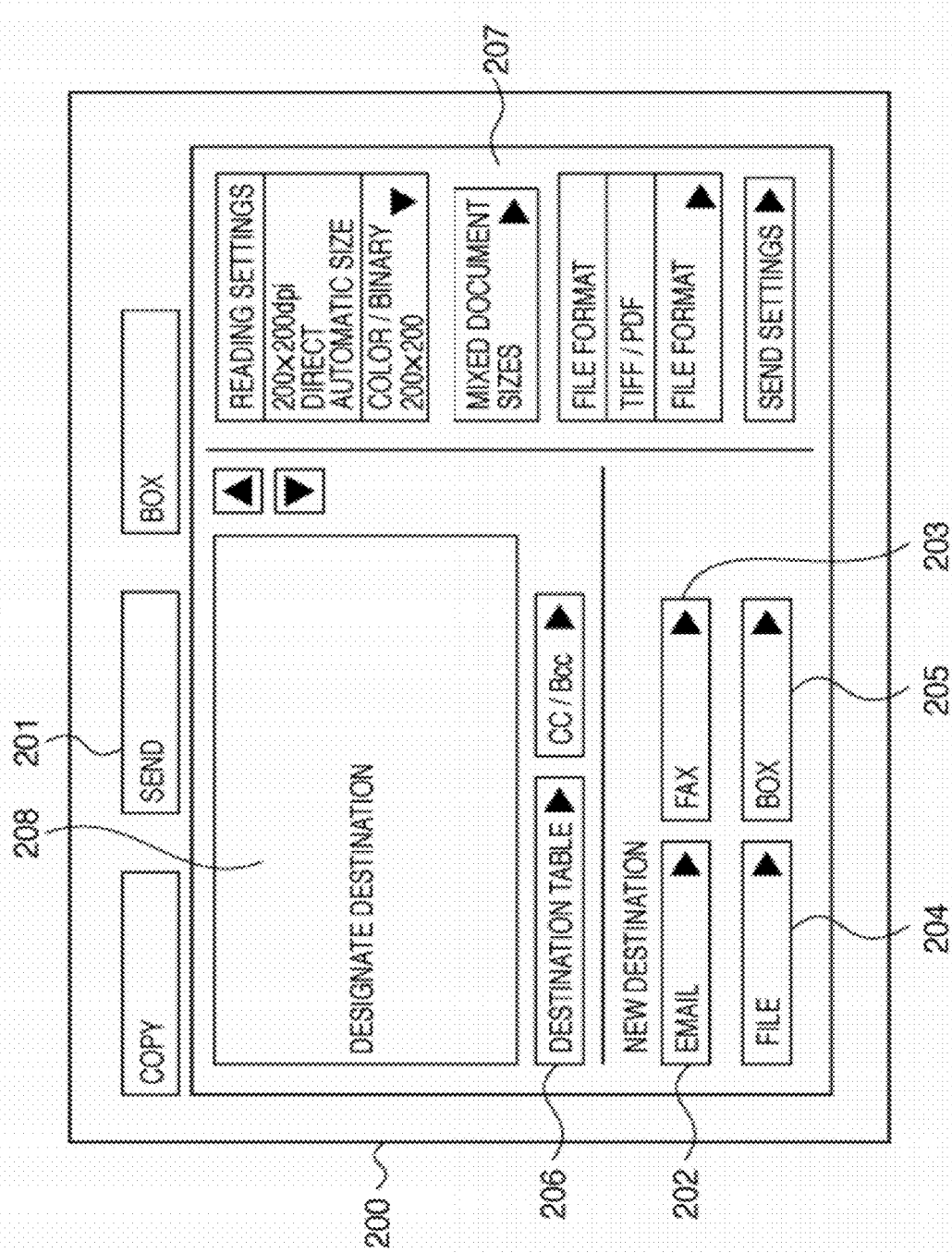

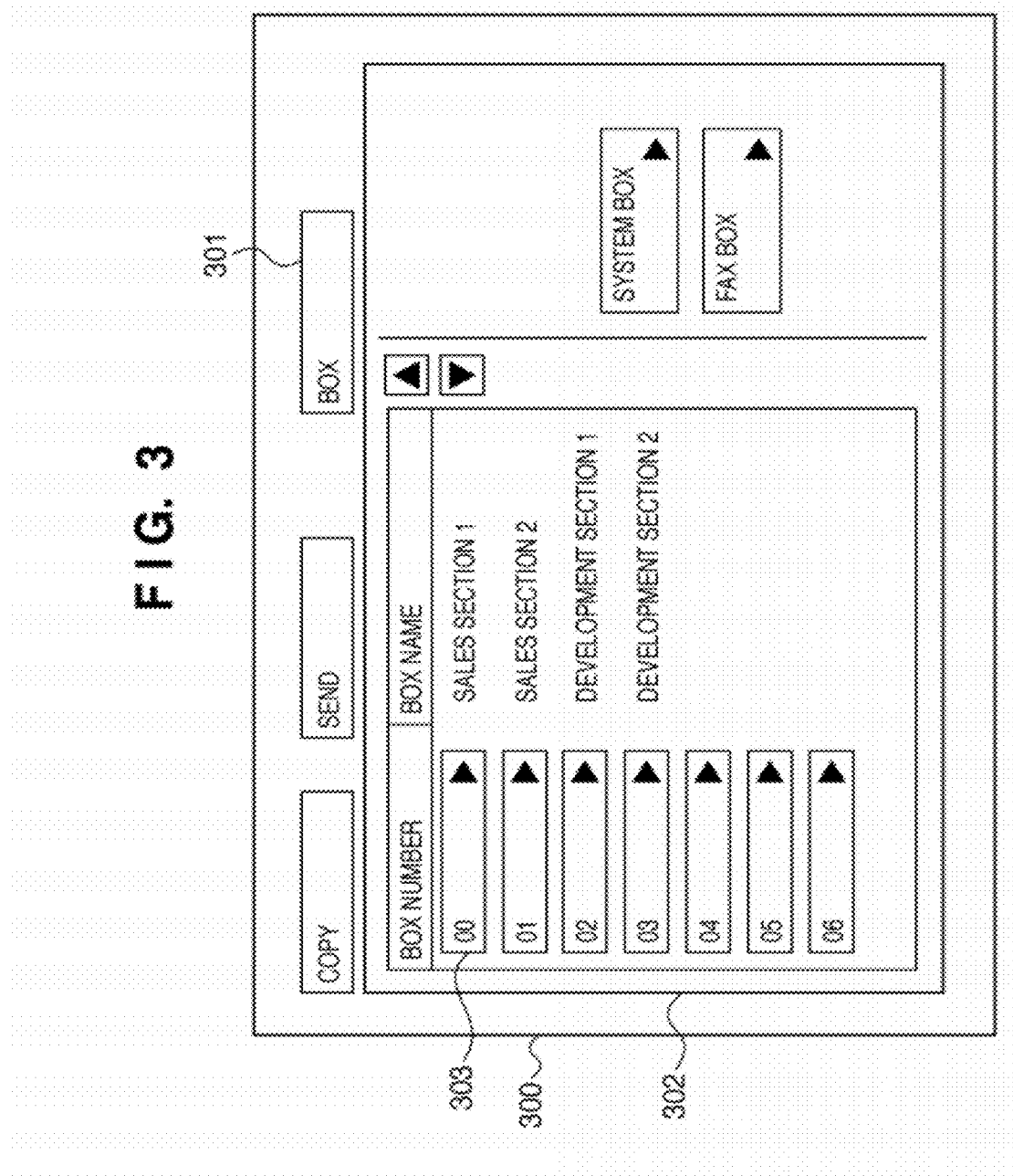

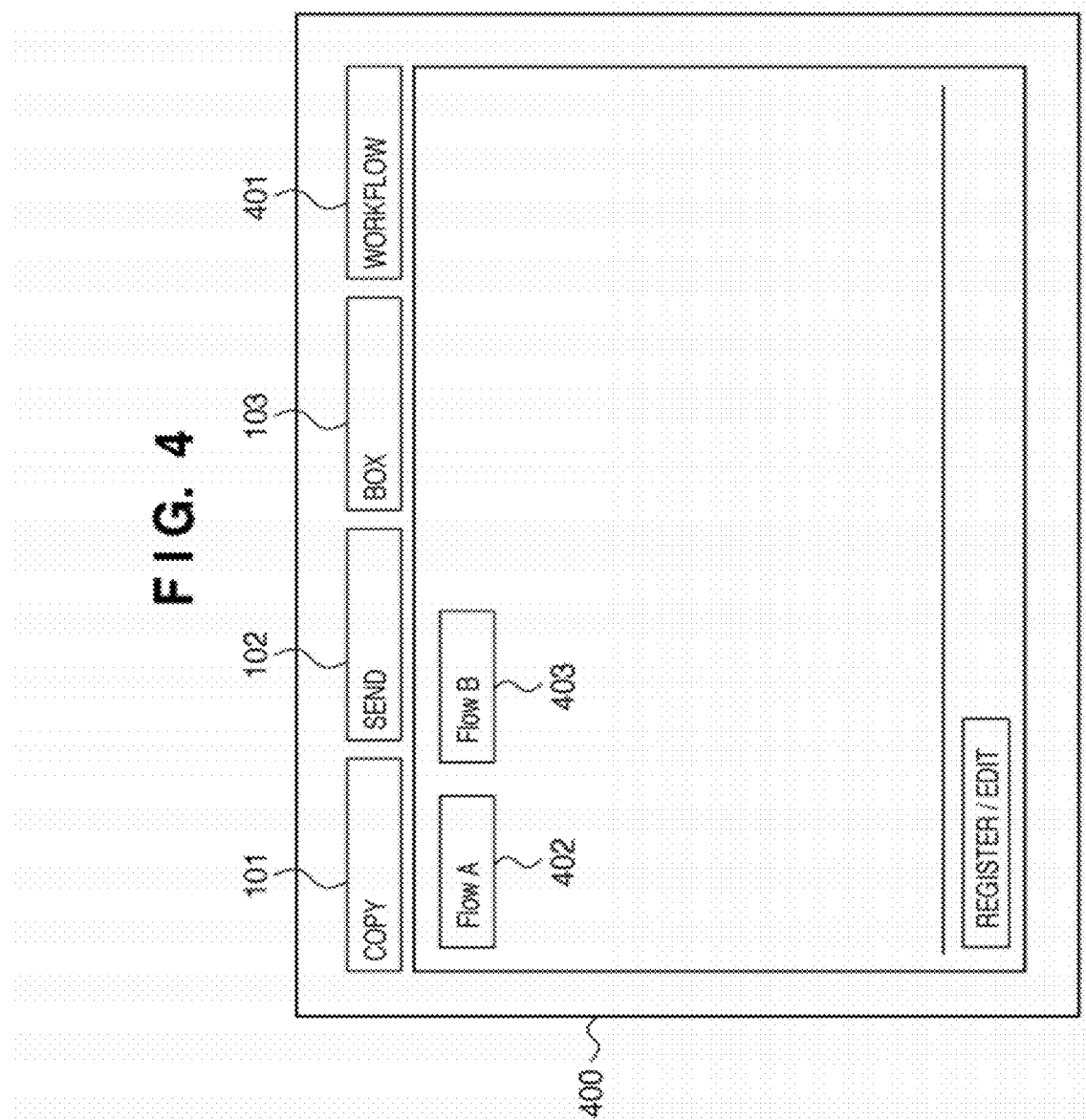

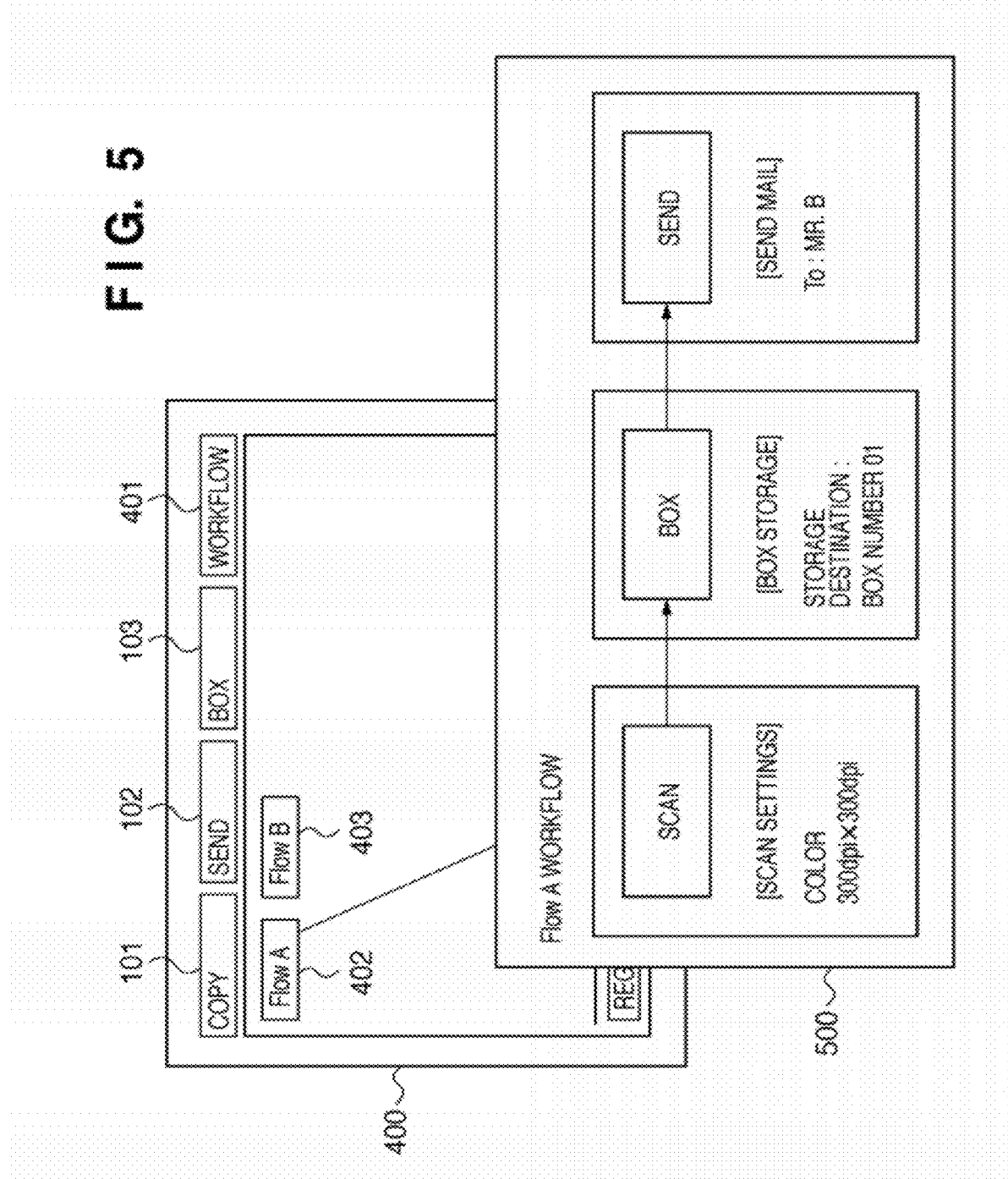

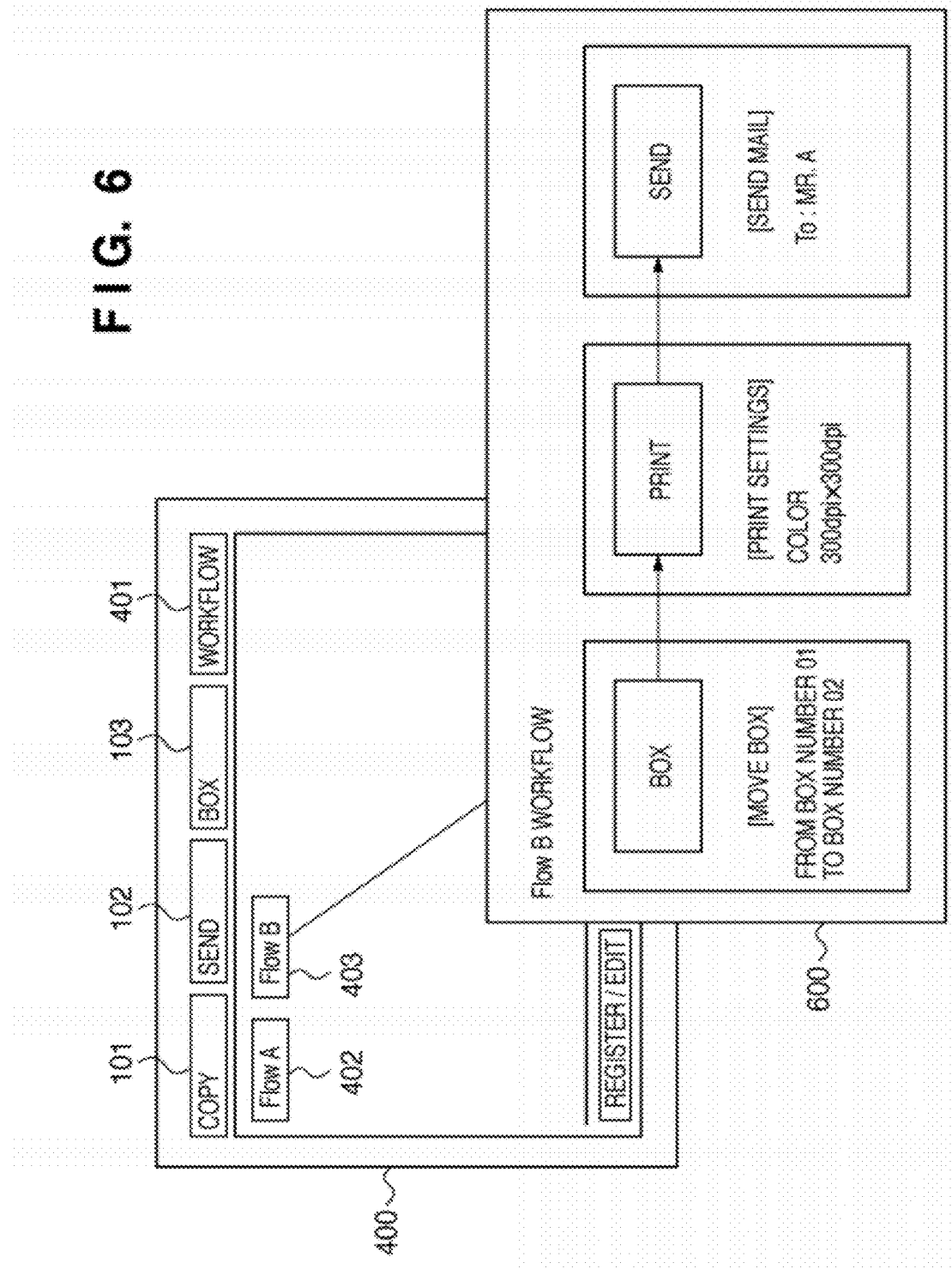

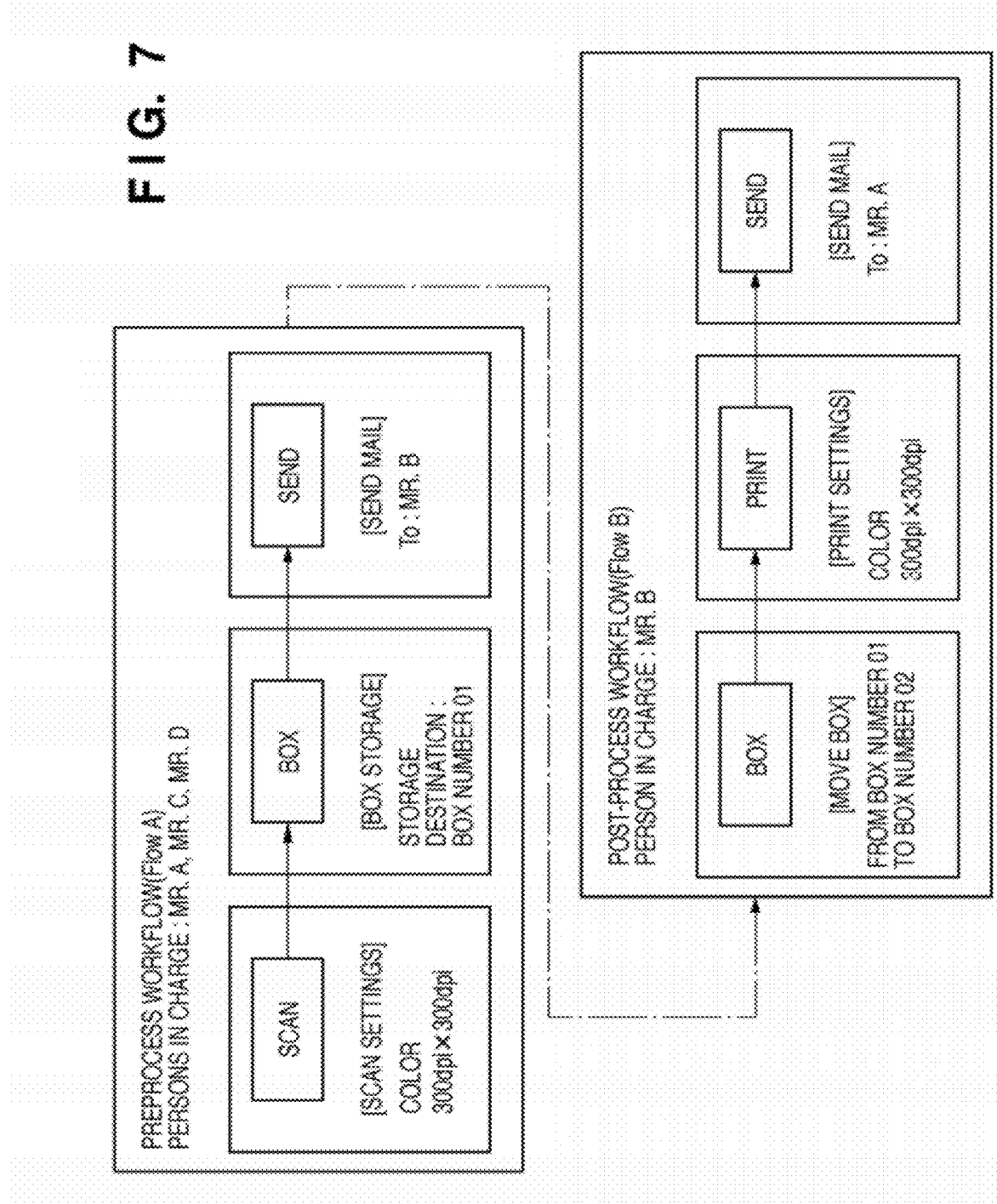

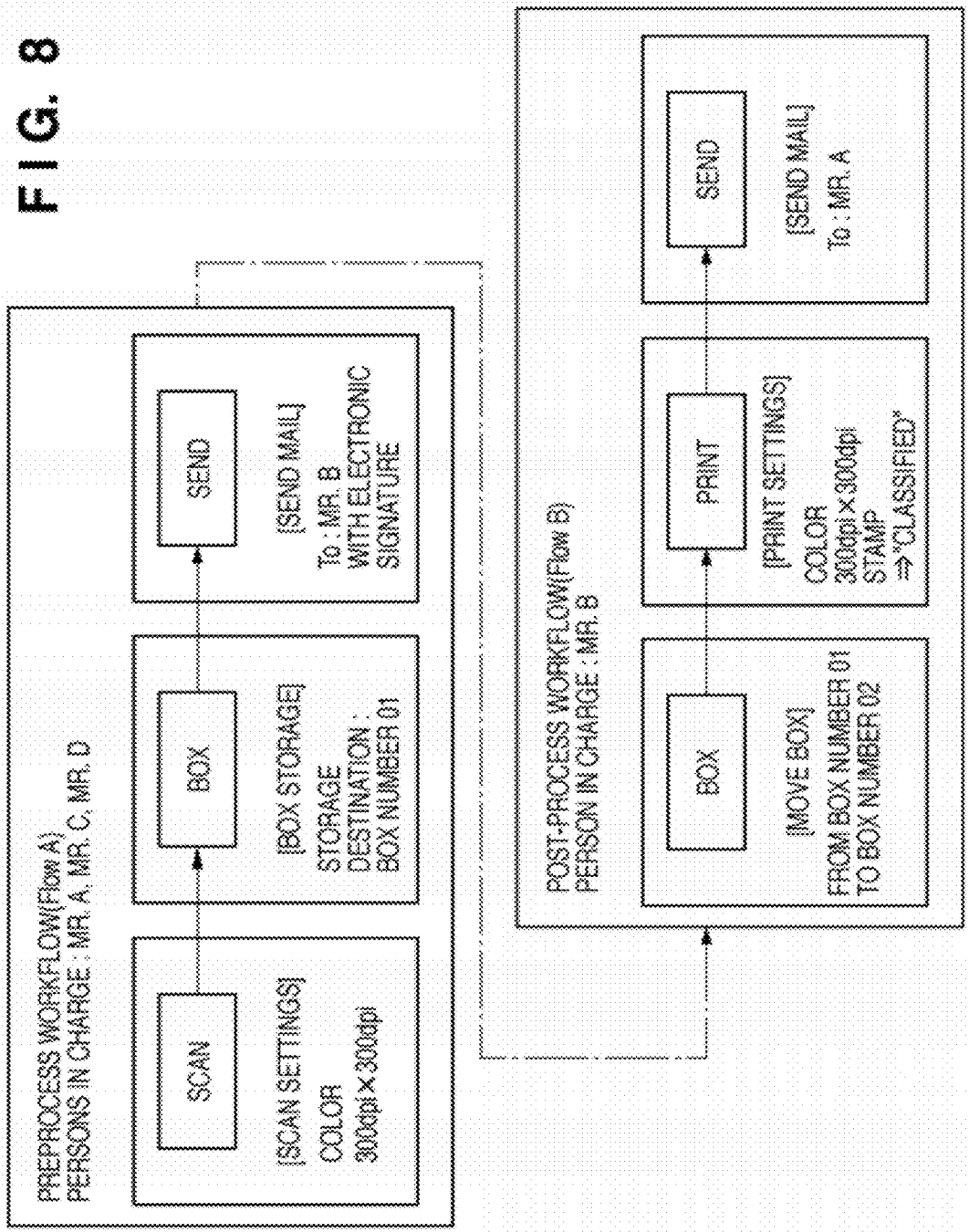

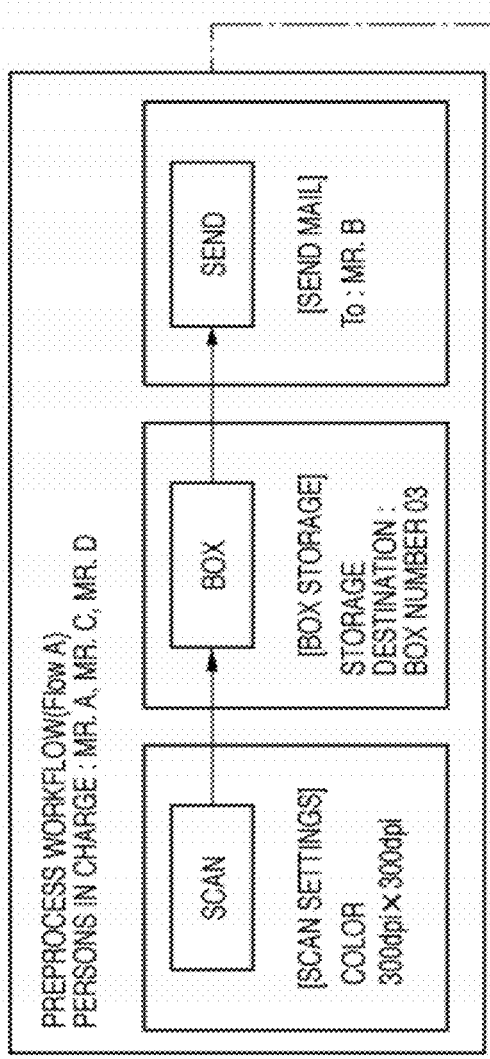
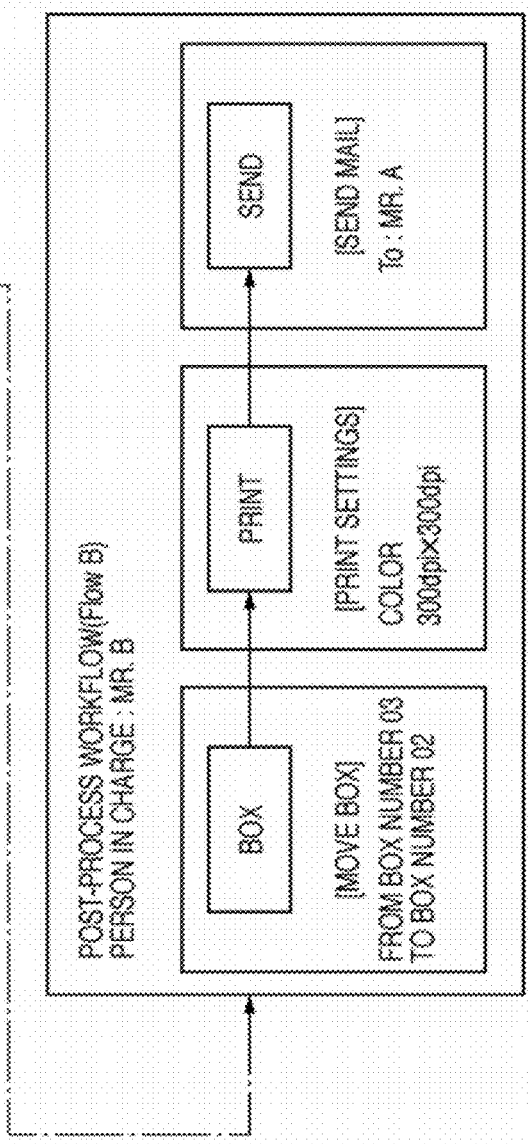

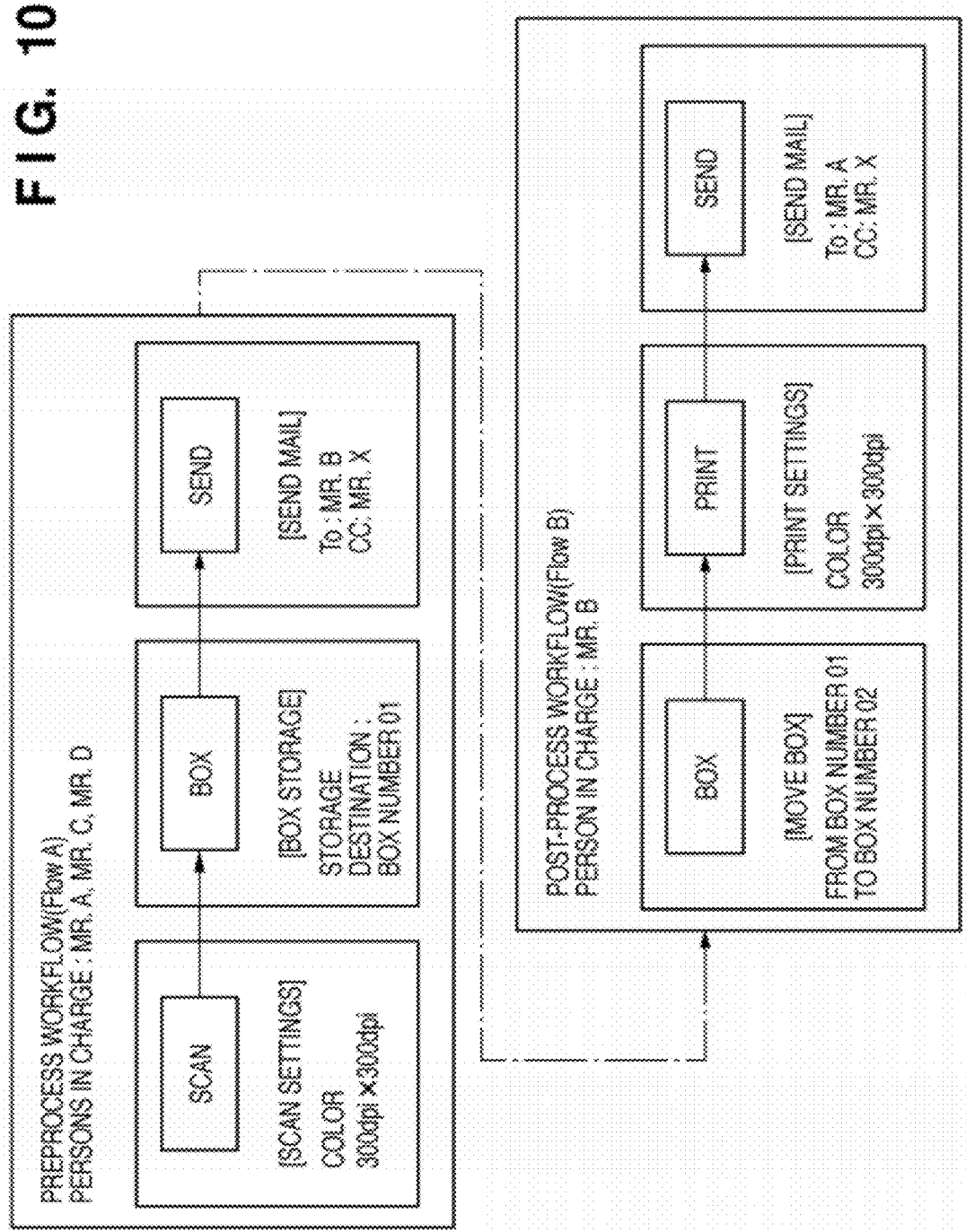

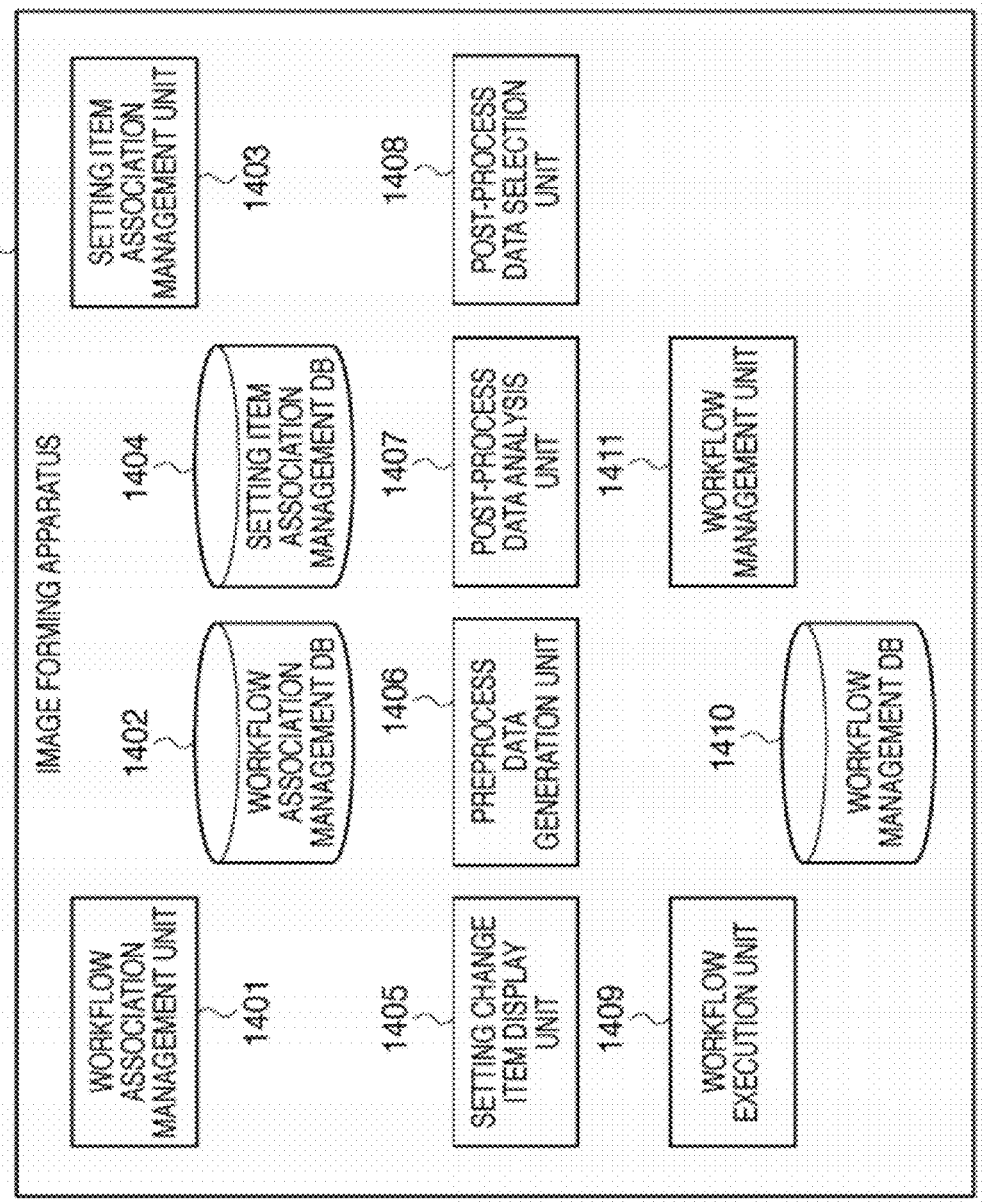

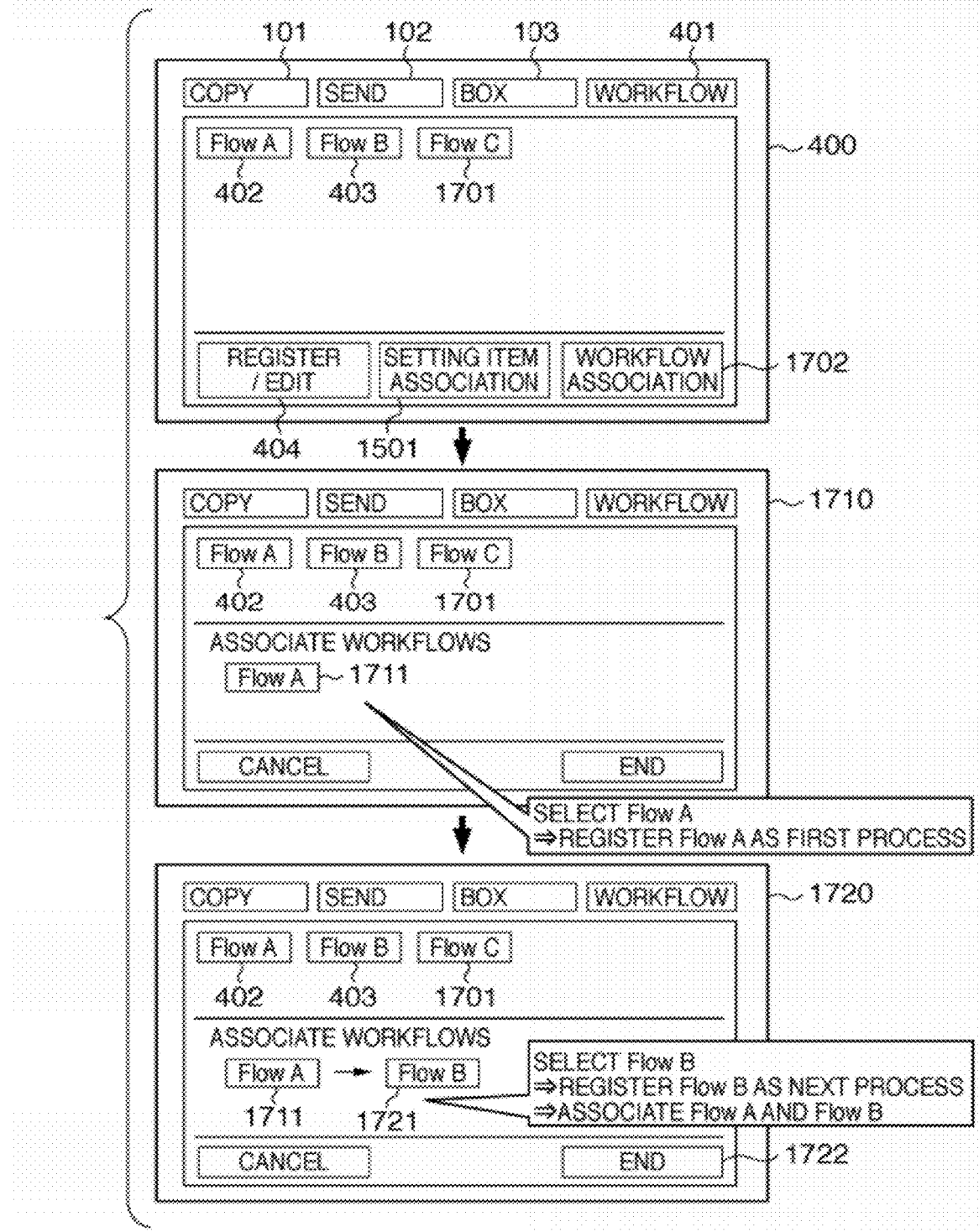

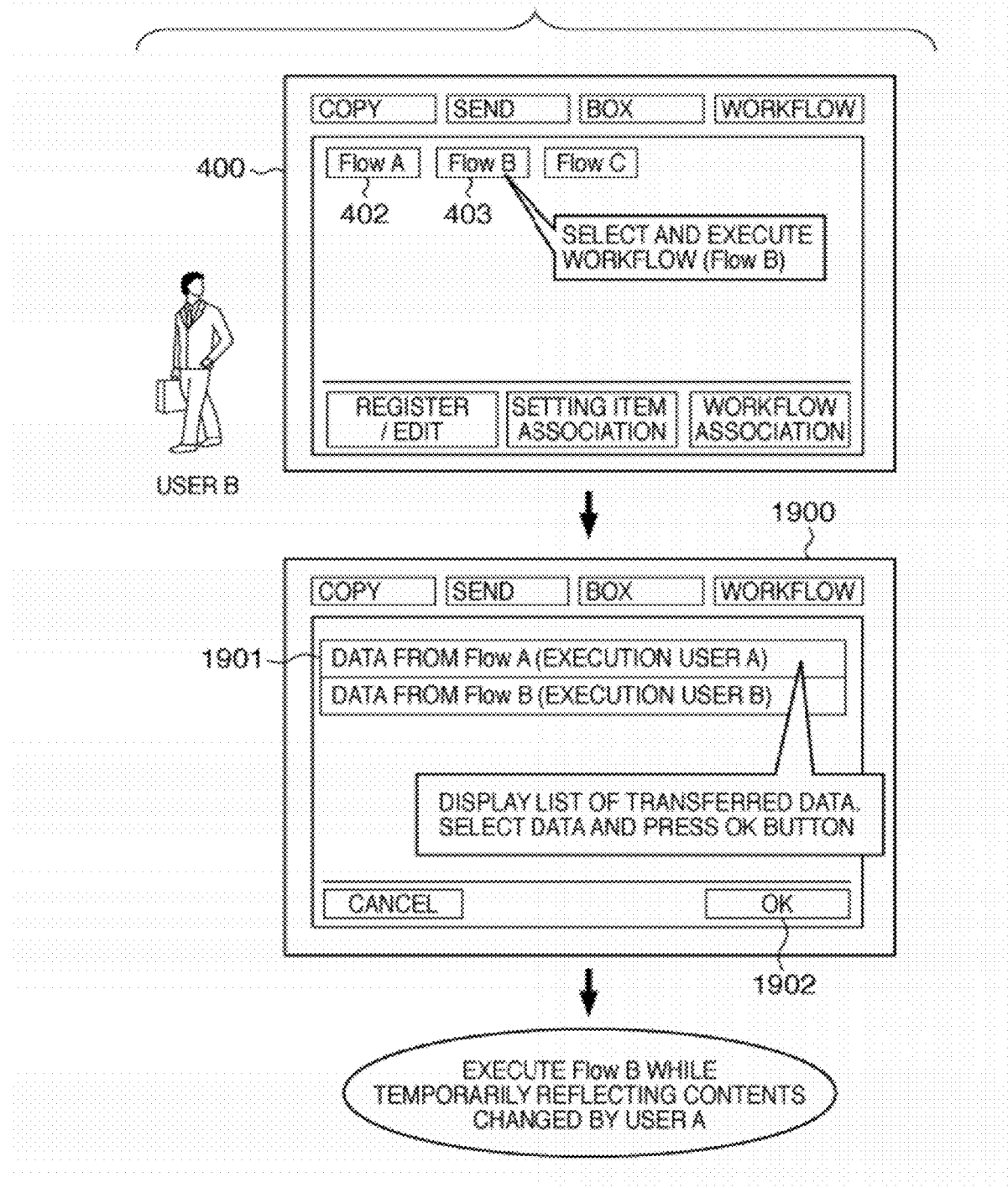

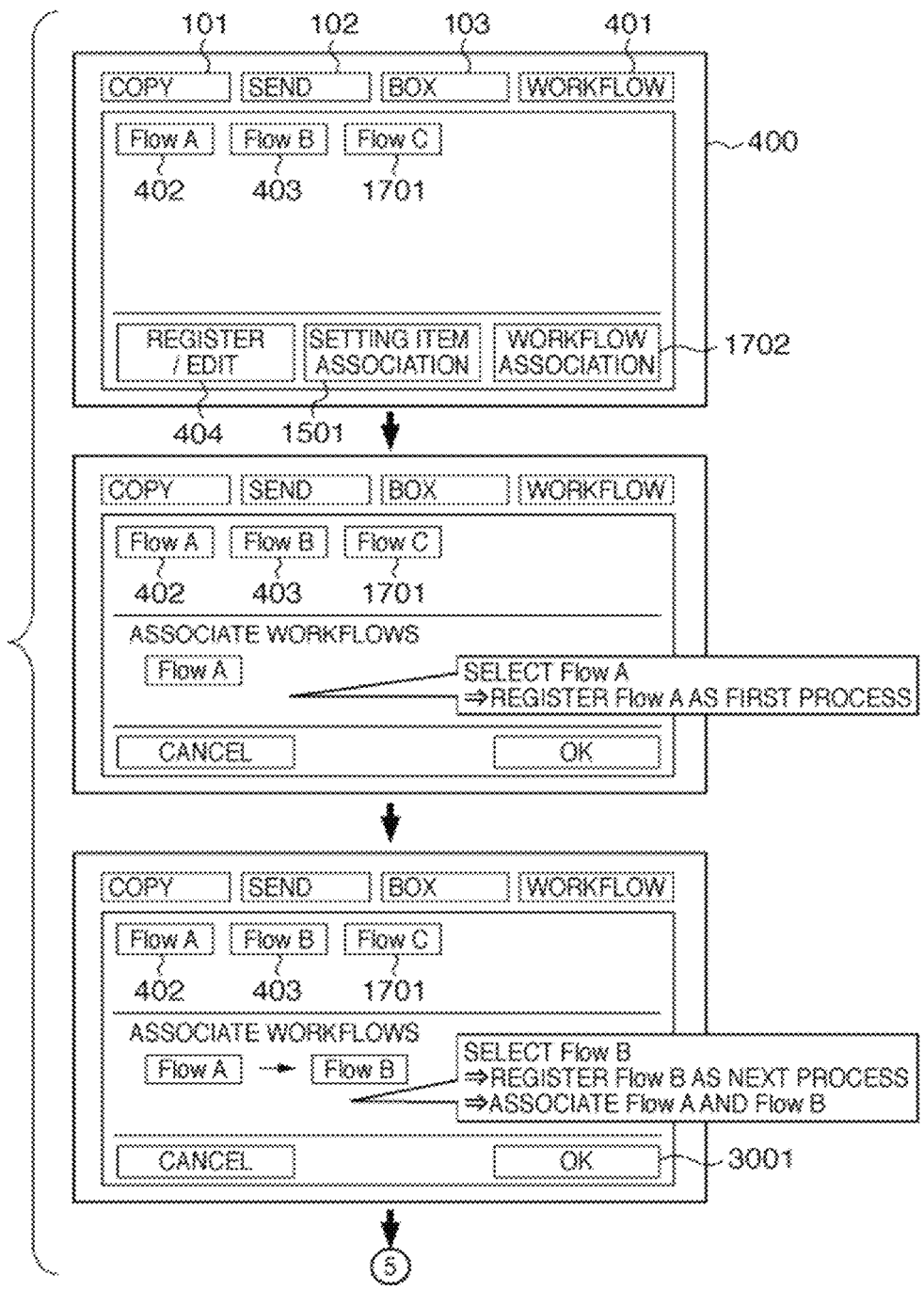
F I G. 30A

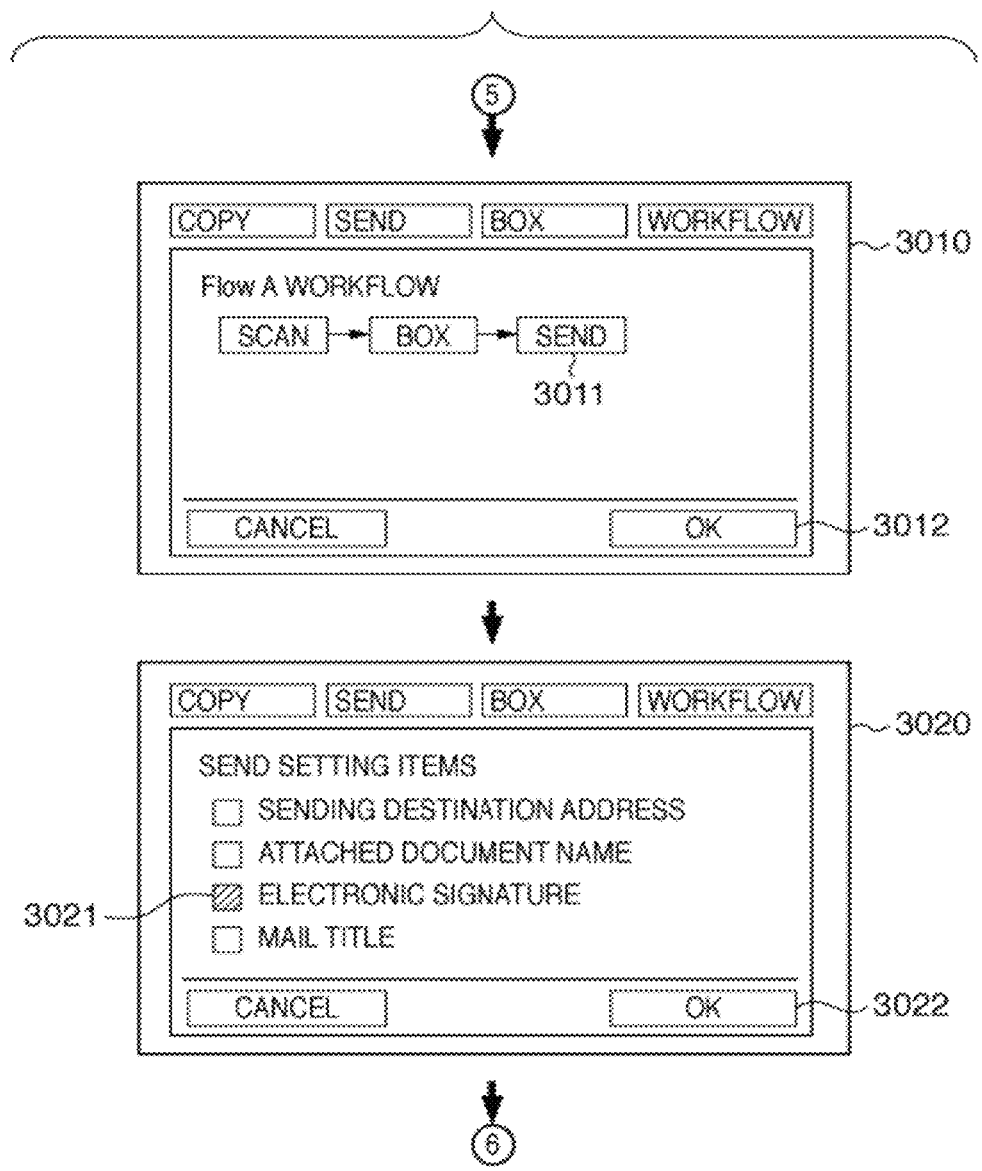

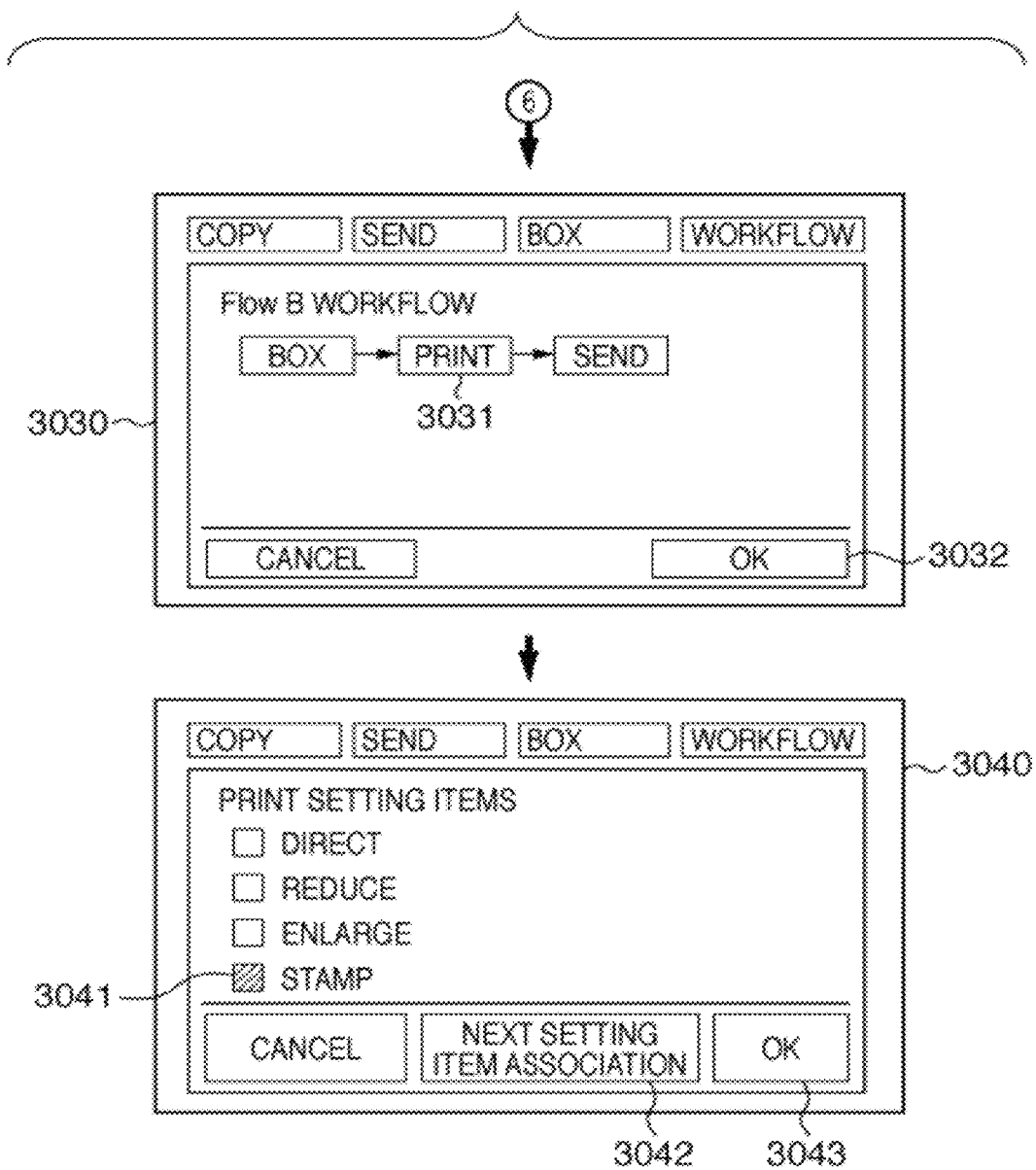
F I G. 30C

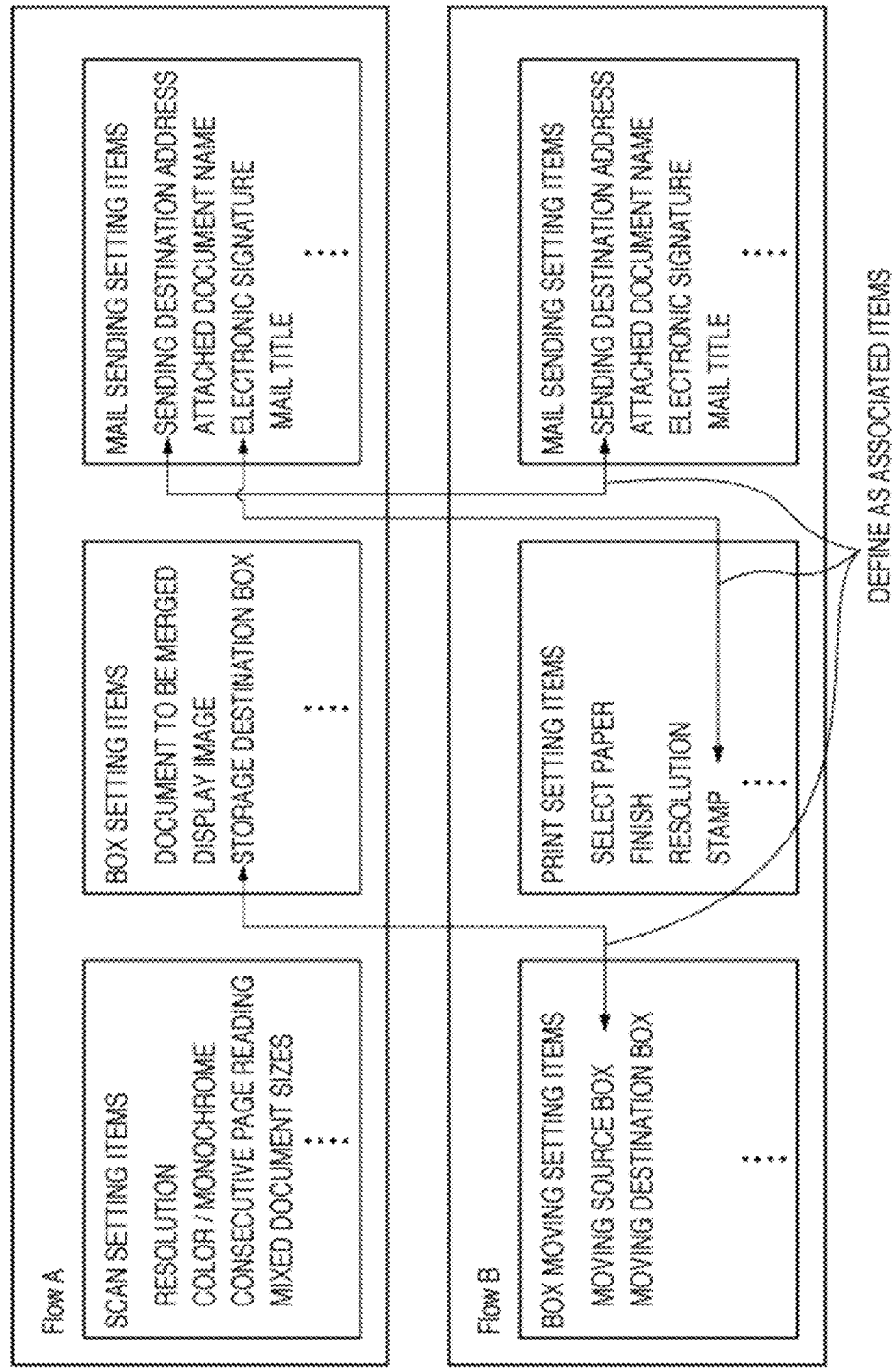

FIG. 32

| SETTING ITEM ASSOCIATION ID | WORKFLOW ASSOCIATION ID | WORK ITEM | SETTING ITEM | WORK ITEM | SETTING ITEM |
|---|---|---|---|---|---|
| XYZ0001 | WfXYZ0001 | BOX | STORAGE DESTINATION BOX | BOX | MOVING SOURCE BOX |
| ABC0002 | WfABC0002 | SEND | ELECTRONIC SIGNATURE | PRINT | STAMP |
| DEF0003 | WfXYZ0001 | SEND | SENDING DESTINATION MAIL ADDRESS(TO) | SEND | SENDING DESTINATION MAIL ADDRESS(CC) |
| ... | ... | ... | ... | ... | ... |

2201, 3201, 2202, 2203, 2204, 2205 — 1404

IMAGE FORMING APPARATUS, METHOD OF CONTROLLING THE SAME, PROGRAM, AND STORAGE MEDIUM

BACKGROUND OF THE INVENTION

1. Field of the Invention

The present invention relates to an image forming technique.

2. Description of the Related Art

Recent image forming apparatuses realize not only basic functions such as copy and printing but also, for example, a box function and a sending function.

The box function is a data storage function of storing scan data in a data area called a box. The sending function puts scan data in a file, attaches the file to mail, and sends it.

For example, to cause an image forming apparatus to copy a paper document, the user performs the following operation. First, the user, for example, presses a copy button 101 on an operation panel shown in FIG. 1 to display a graphical user interface (to be referred to as a GUI hereinafter) such as a copy setting window 100 in FIG. 1. The user then does various kinds of settings such as color/monochrome, print magnification, and double-sided/single-sided printing in a copy setting portion 102 on the GUI. When the user finally sets a paper document on the image forming apparatus and presses a start button formed from a hardware key, the image forming apparatus copies the paper document.

To cause the image forming apparatus to send mail containing scan data of a paper document, the user performs the following operation. First, the user, for example, presses a send button 201 on the operation panel shown in FIG. 2 to display a GUI such as a sending destination setting window 200 in FIG. 2. The user then does process settings (settings such as color/monochrome, resolution, and file format) for file creation of the scan data in a filing process setting portion 207. Next, the user presses an email button 202 on the GUI to display an email address input window to input destinations. The user inputs email addresses as mail sending destinations on the displayed email address input window. Alternatively, the user presses a destination table button 206 to display a list of destination information (email addresses) registered in advance and selects arbitrary destination information from the list. With these operations, a destination display portion 208 displays a list of email addresses input or selected as destinations. When the user finally sets a paper document on the image forming apparatus and presses the start button formed from a hardware key, the image forming apparatus sends the file of the scan data to the designated email addresses.

Note that as indicated by buttons 203 to 205 in FIG. 2, the user can designate not only email addresses but also a facsimile apparatus or a shared folder on a network as the destination of the file containing the scan data.

To cause the image forming apparatus to store scan data of a paper document in a box provided in itself, the user performs the following operation. First, the user, for example, presses a box button 301 on the operation panel shown in FIG. 3 to display a GUI such as a box management window 300 in FIG. 3. The user then presses a box number button 303 in a box setting portion 302 on the GUI to designate a box to store the data. When the user finally sets a paper document on the image forming apparatus and presses the start button formed from a hardware key, the image forming apparatus stores the scan data of the paper document in the designated box.

The image forming apparatus is used for tasks in an office or the like not only by designating individual functions such as copy, send, and box storage but also by combining these functions.

For example, the user may want to "scan a paper document, store the scan data in a box, and send the data to people concerned by mail". Alternatively, the user may want to "put a plurality of data stored in a box together (combine the data into one data) and print them"

In such a case, the user needs to set each function. It is inconvenient for the user to do settings each time he/she uses the image forming apparatus. An application has been proposed for this purpose, which can set each function such as copy, send, or box as one work item and define and execute a workflow by presetting the execution order of a plurality of work items and the process setting contents of each work item.

Also proposed is a service processing apparatus which controls not only individual functions of an image forming apparatus but also a plurality of services cooperatively (Japanese Patent Laid-Open No. 2004-287860).

Operation examples of an application capable of defining and executing a workflow by presetting the execution order of a plurality of work items and the process setting contents of each work item will be described with reference to FIGS. 4, 5, and 6.

The user presses a workflow button 401 in FIG. 4 to display a workflow management window 400 on the operation panel of the image forming apparatus. The workflow management window 400 indicates a state in which two workflows are registered in advance. A Flow A workflow execution button 402 is used to execute a workflow "Flow A" registered in advance. A Flow B workflow execution button 403 is used to execute a workflow "Flow B" registered in advance. When the user presses a workflow execution button corresponding to a workflow to be executed, the image forming apparatus executes the workflow.

FIG. 5 is a view for explaining the definition of the workflow "Flow A" registered in advance. As indicated by 500, "Flow A" is defined to execute work items "scan", "box", and "send" in this order. The work item "scan" is set to execute scan in color at 300×300 dpi. The work item "box" is set to store data using a box having box number 01 as the storage destination. The work item "send" is set to send email to Mr. B.

FIG. 6 is a view for explaining the definition of the workflow "Flow B" registered in advance. As indicated by 600, "Flow B" is defined to execute work items "box", "print", and "send" in this order. The work item "box" is set to move data from a box having box number 01 to a box having box number 02. The work item "print" is set to execute printing in color at 300×300 dpi. The work item "send" is set to send email to Mr. A.

The workflow definitions shown in FIGS. 5 and 6 allow the user to use various functions of the image forming apparatus at once as a workflow only by pressing the workflow execution button 402 or 403. Additionally, the user need not redo the complex settings every time he/she will use the image forming apparatus.

The application for executing workflows is used in an office or the like to execute routine tasks or tasks with cumbersome settings.

For a task in, for example, an office, various workflow execution patterns are available. For example, one task is completed by causing one user to execute one workflow. Alternatively, persons in charge at different sites do an operation cooperatively. For example, a plurality of users execute different workflows in a preprocess and post-process, thereby completing one task, as shown in FIG. 7.

In the preprocess, the person in charge in executing the workflow "Flow A" is Mr. A, C, or D. In this process, the image forming apparatus scans a paper document, stores data in the box, and executes mail sending for Mr. B to send notification mail to Mr. B. The only person in charge in executing the workflow "Flow B" is Mr. B. Mr. B receives the notification mail and executes the workflow "Flow B" of the post-process. The image forming apparatus then extracts the data from the box and prints it. After printing, a completion notification is sent to Mr. A. One task starting from the workflow "Flow A" is thus completed.

When a plurality of users execute different workflows, there may be necessity of temporarily changing the setting contents of the work items in the post-process workflow to be executed by user B after user A has executed the preprocess workflow. Examples of the case in which the setting contents of the work items in the post-process workflow should temporarily be changed are use cases shown in FIGS. 8 to 10.

For example, as shown in FIG. 8, when an electronic signature is added to the file sent by mail upon executing the preprocess workflow, the file is changed to "classified" in the post-process. To make the printed product itself classified, print settings in the post-process workflow are done to print a stamp "classified".

Alternatively, as shown in FIG. 9, the document storage destination in the preprocess workflow is changed by designating the box (03) of the document extraction source and the box (02) of the moving destination in the post-process workflow.

Otherwise, as shown in FIG. 10, when a material is created in cooperation with user X as well as persons A, C, and D in charge of the preprocess and person B in charge of the post-process, user X is added to the CC address for mail sending in the preprocess and post-process for that time only.

A measure against the above use cases is preparing in advance all workflow patterns to be used by the users. In this case, each user who will execute the preprocess or post-process selects and executes an appropriate workflow. However, preparing all workflow patterns in advance is not practical from the viewpoints of efficient utilization of the memory resource of the image forming apparatus and the increase in the operation load on the workflow manager.

Alternatively, the workflow itself to be executed by user B may be changed. However, if the workflow is managed while being shared by all users, user A's editing the setting contents of the post-process workflow causes a change in the setting contents of the post-process workflow to be executed by all users. This poses a problem such as inconsistency in the post-process workflow to be executed by any user other than user B.

Even when the workflow is managed for each user, the following situation may occur. For example, user A edits the setting contents of the post-process workflow of user B. In this case, the setting contents of the post-process workflow to be executed by user B change not only corresponding to the workflow of user A but also corresponding to the workflow executed by user C or D.

When user A executes the workflow, the person in charge of the post-process workflow may be unknown. In this case, it is impossible to edit the setting contents of the post-process workflow themselves.

In view of the above-described problems, a user is preferably able to temporarily change the setting contents of a work item of the post-process workflow to be executed by an arbitrary user when executing the preprocess workflow.

In the above-described prior art, however, management is done for each execution unit (e.g., workflow). It is therefore difficult to temporarily change setting contents associated between workflows. In addition, the execution unit may be managed for each user. In this case, it is also difficult to temporarily change the setting contents of a workflow which is not to be executed by the user himself/herself.

SUMMARY OF THE INVENTION

The present invention provides an image forming technique of making it possible to flexibly change the setting contents of a workflow even when a plurality of users execute different workflows to complete one task.

According to one aspect of the present invention, there is provided an image forming apparatus capable of defining each of a plurality of executable functions as one work item and executing a plurality of workflows each combining the work items, comprising: a setting item association unit adapted to designate a setting item to execute a function corresponding to a work item and associate the designated setting item between a plurality of work items; a workflow association unit adapted to designate, in a plurality of workflows registered in advance as executable workflows, a preprocess workflow to be executed first and a post-process workflow to be executed based on an execution result of the preprocess, thereby associating the preprocess workflow and the post-process workflow with each other; a setting change reception unit adapted to receive a setting change for a setting item of a work item that constitutes the preprocess workflow and reflect contents of the setting change on a setting item of a work item that constitutes the post-process workflow, the setting item being associated by the setting item association unit; a data generation unit adapted to generate data including the execution result of the preprocess workflow and the contents of the setting change reflected by the setting change reception unit; an analysis unit adapted to analyze, based on the data generated by the data generation unit, whether a setting change has been done for the setting item of the work item that constitutes the post-process workflow; and a workflow execution unit adapted to control execution of the post-process workflow based on an analysis result of the analysis unit.

According to another aspect of the present invention, there is provided a method of controlling an image forming apparatus capable of defining each of a plurality of executable functions as one work item and executing a plurality of workflows each combining the work items, comprising the steps of: designating a setting item to execute a function corresponding to a work item and associating the designated setting item between a plurality of work items; designating, in a plurality of workflows registered in advance as executable workflows, a preprocess workflow to be executed first and a post-process workflow to be executed based on an execution result of the preprocess, thereby associating the preprocess workflow and the post-process workflow with each other; receiving a setting change for a setting item of a work item that constitutes the preprocess workflow and reflecting contents of the setting change on a setting item of a work item that constitutes the post-process workflow, the setting item being associated in the step of associating the setting item; generating data including the execution result of the preprocess workflow and the contents of the setting change reflected in the step of receiving the setting change; analyzing, based on the data generated in the step of generating the data, whether a setting change has been done for the setting item of the work item that constitutes the post-process workflow; and controlling execution of the post-process workflow based on an analysis result in the step of analyzing.

According to the present invention, it is possible to flexibly change the setting contents of a workflow even when a plurality of users execute different workflows to complete one task.

A preprocess workflow execution user who does not execute a post-process workflow can change the setting contents of the post-process workflow associated with setting contents changed in the preprocess workflow. The changed setting contents are temporarily reflected when executing the post-process workflow.

This makes it unnecessary to correct and edit the post-process workflow each time even when the user wants to temporarily change the setting contents of the preprocess workflow. In addition, the post-process workflow execution user can execute the workflow without awareness of the changed contents of the preprocess, resulting in an increase in user convenience.

Further features of the present invention will become apparent from the following description of exemplary embodiments (with reference to the attached drawings).

BRIEF DESCRIPTION OF THE DRAWINGS

FIG. 1 is a view for explaining a copy operation;

FIG. 2 is a view for explaining a send operation;

FIG. 3 is a view for explaining a box operation;

FIG. 4 is a view for explaining the operation of an application for executing workflows;

FIG. 5 is a view for explaining the definition of a workflow "Flow A" registered in advance;

FIG. 6 is a view for explaining the definition of a workflow "Flow B" registered in advance;

FIG. 7 is a view for explaining processing of completing one task by causing a plurality of users to execute different workflows;

FIG. 8 is a view for explaining a use case when temporarily changing the setting contents of a work item of a post-process workflow;

FIG. 9 is a view for explaining another use case when temporarily changing the setting contents of a work item of a post-process workflow;

FIG. 10 is a view for explaining still another use case when temporarily changing the setting contents of a work item of a post-process workflow;

FIG. 14 is a block diagram for explaining the functional arrangement of the image forming apparatus according to the embodiment of the present invention;

FIG. 17 is a view for explaining an operation procedure when a workflow manager or a user associates workflows on the operation unit of the image forming apparatus;

FIG. 19 is a view for explaining an operation procedure when a user executes a post-process workflow on the operation unit of the image forming apparatus;

FIGS. 30A-30C are views for explaining an operation procedure when a workflow manager or a user associates the setting items of work items in every workflow association on the operation unit of an image forming apparatus according to the third embodiment;

FIG. 31 is a view showing the association result of the setting items of work items in every workflow association; and FIG. 32 is a view showing the data structure of a setting item association management DB according to the third embodiment.

DESCRIPTION OF THE EMBODIMENTS

Embodiments of the present invention will now be described in detail with reference to the accompanying drawings. Note that the constituent elements described in the embodiments are merely examples. The technical scope of the present invention is determined by the scope of claims and is not limited by the following individual embodiments.

First Embodiment

Figure 11:
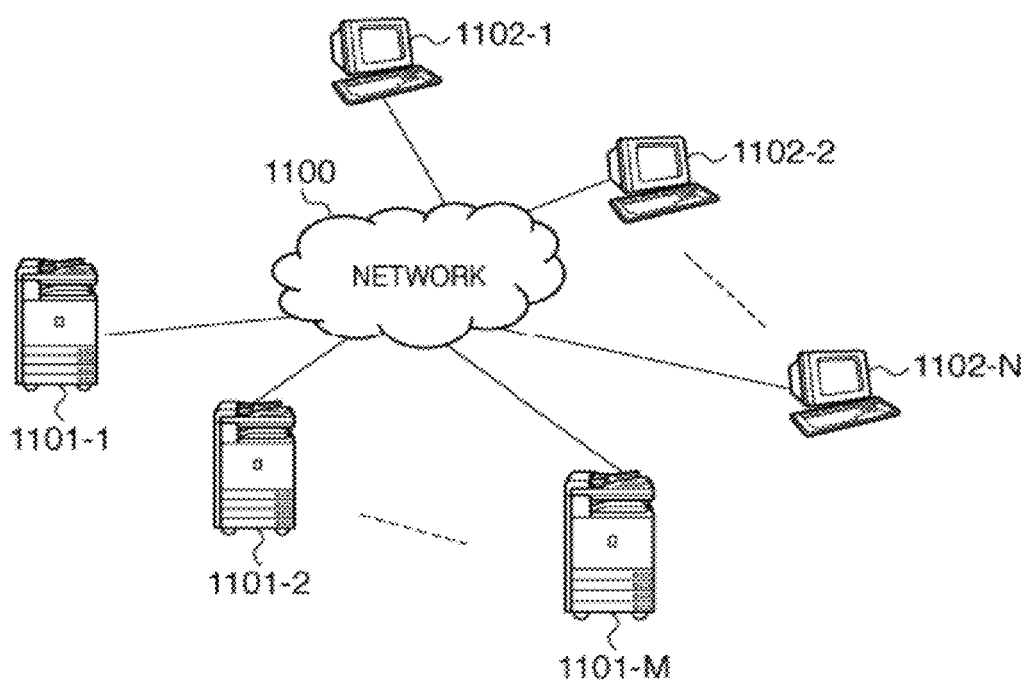
FIG. 11 is a view showing the schematic arrangement of an image forming system including an image forming apparatus according to an embodiment of the present invention.

FIG. 11 is a view showing the schematic arrangement of an image forming system including an image forming apparatus according to the first embodiment of the present invention. The image forming apparatus can define each of a plurality of executable functions (e.g., scan, copy, print, data storage, and data send) as one work item and execute a plurality of workflows by combining the work items.

As shown in FIG. 11, a plurality of image forming apparatuses 1101-1, 1101-2, ..., 1101-M and a plurality of information processing apparatuses 1102-1, 1102-2, ..., 1102-N such as PCs are connected via a network 1100. The network 1100 includes a network system capable of two-way communication such as the Internet or an intranet. For the descriptive convenience, an arbitrary one of the plurality of image forming apparatuses 1101-1, 1101-2, ..., 1101-M will be referred to as an image forming apparatus 1101-X. An arbitrary one of the plurality of information processing apparatuses 1102-1, 1102-2, ..., 1102-N will be referred to as an information processing apparatus 1102-Y.

In this embodiment, a case will be explained in which a plurality of users cooperatively execute different workflows using one image forming apparatus 1101-X. However, the image forming apparatus 1101-X is connected to the network 1100. For this reason, the image forming apparatus 1101-X and another image forming apparatus 1101-X' may share data. After user A has executed a workflow using the image forming apparatus 1101-X, user B may execute a workflow using the image forming apparatus 1101-X'.

(Arrangement of Information Processing Apparatus)

Figure 12:
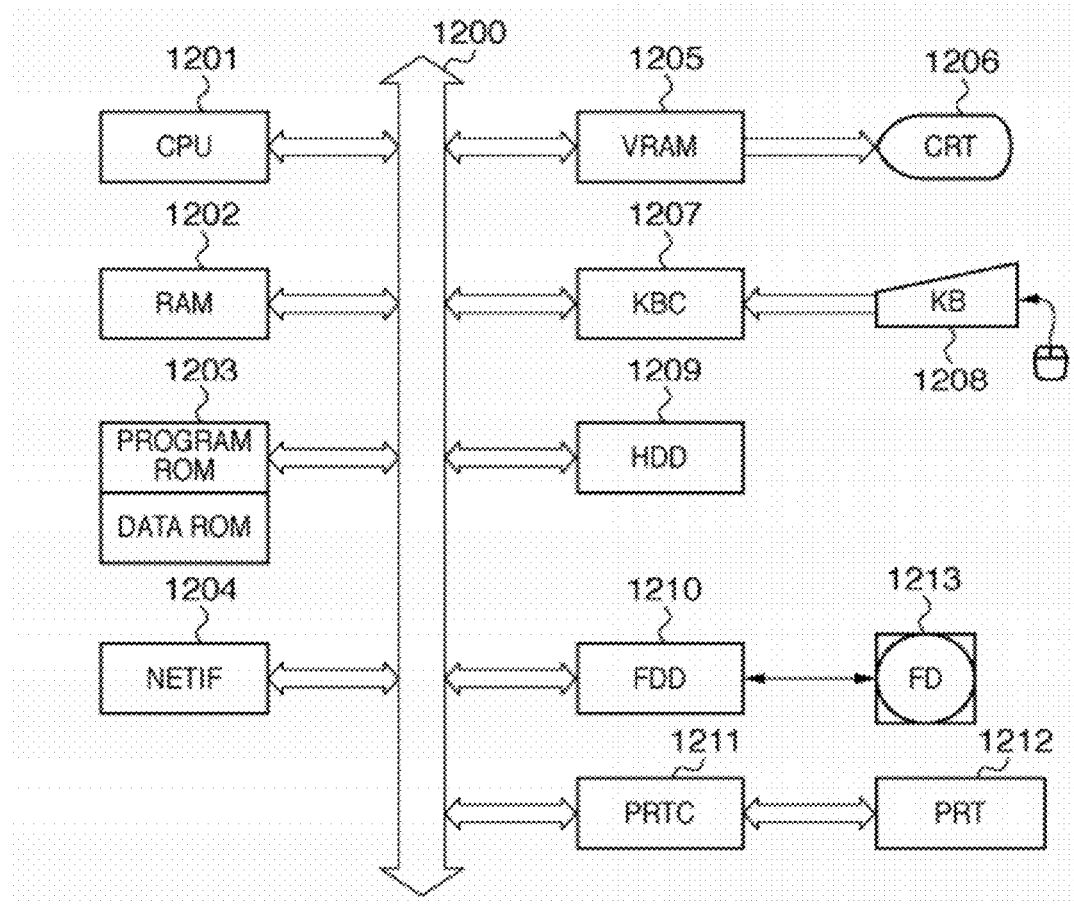
FIG. 12 is a block diagram showing the arrangement of an information processing apparatus according to the embodiment of the present invention.

FIG. 12 is a block diagram showing the arrangement of the information processing apparatus 1102-Y. Referring to FIG. 12, a central processing unit (to be referred to as a CPU hereinafter) 1201 is in charge of operation and control of the information processing apparatus.

A random access memory (to be referred to as a RAM hereinafter) 1202 serving as the main memory of the CPU 1201 functions as an execution area for an execution program and a data area.

A read only memory (to be referred to as a ROM hereinafter) 1203 stores, for example, the operation processing procedure of the CPU 1201. The ROM 1203 includes a program ROM which records basic software (OS) as a system program for device control of the information processing apparatus, and a data ROM which records information and the like necessary for operating the system. Depending on the device, an HDD 1209 (to be described later) is usable in place of the ROM 1203.

A network interface (to be referred to as a NETIF hereinafter) 1204 performs control and connection state diagnosis for data transfer between information processing apparatuses via a network.

A video RAM (to be referred to as a VRAM hereinafter) 1205 rasterizes an image to be displayed on the screen of a CRT 1206 to indicate the operation state of the information processing apparatus to be described later and controls the display.

The display device (to be referred to as a CRT hereinafter) 1206 such as a display displays workflow settings and various information processing results.

A controller (to be referred to as a KBC hereinafter) 1207 controls the input signal from an external input device 1208.

The external input device (to be referred to as a KB hereinafter) 1208 receives a user operation. For example, a keyboard or a pointing device such as a mouse is used.

The hard disk drive (to be referred to as an HDD hereinafter) 1209 is used to store application programs and various kinds of data. An application program of this embodiment is, for example, a software program to be executed by various kinds of processing units of this embodiment.

An external input/output device (to be referred to as an FDD hereinafter) 1210 is, for example, a flexible disk drive or a CD-ROM drive to input/output a removable disk. The FDD 1210 is used to, for example, read out the above-described application program from a storage medium.

A magnetic recording medium (to be referred to as an FD hereinafter) 1213 is a removable data recording device (removable medium) such as an optical recording medium, a magnetooptical recording medium, or a semiconductor recording medium that is read-accessed by the FDD 1210. Examples of a magnetic recording medium are a flexible disk and an external hard disk. An example of an optical recording medium is a CD-ROM. An example of a magnetooptical recording medium is an MO. An example of a semiconductor recording medium is a memory card.

The application programs and data stored in the HDD 1209 may be stored in the FDD 1210 and used.

A controller (to be referred to as a PRTC hereinafter) 1211 controls output signals to a PRT 1212 (to be described later).

The printing apparatus (to be referred to as a PRT hereinafter) 1212 can be, for example, an LBP (Laser Beam Printer). However, the present invention is not limited to this example. For example, an inkjet printing apparatus is also usable.

A transfer bus 1200 connects the above-described units. The transfer bus 1200 includes, for example, an address bus, a data bus, an input/output bus, and a control bus.

(Arrangement of Image Forming Apparatus)

Figure 13:
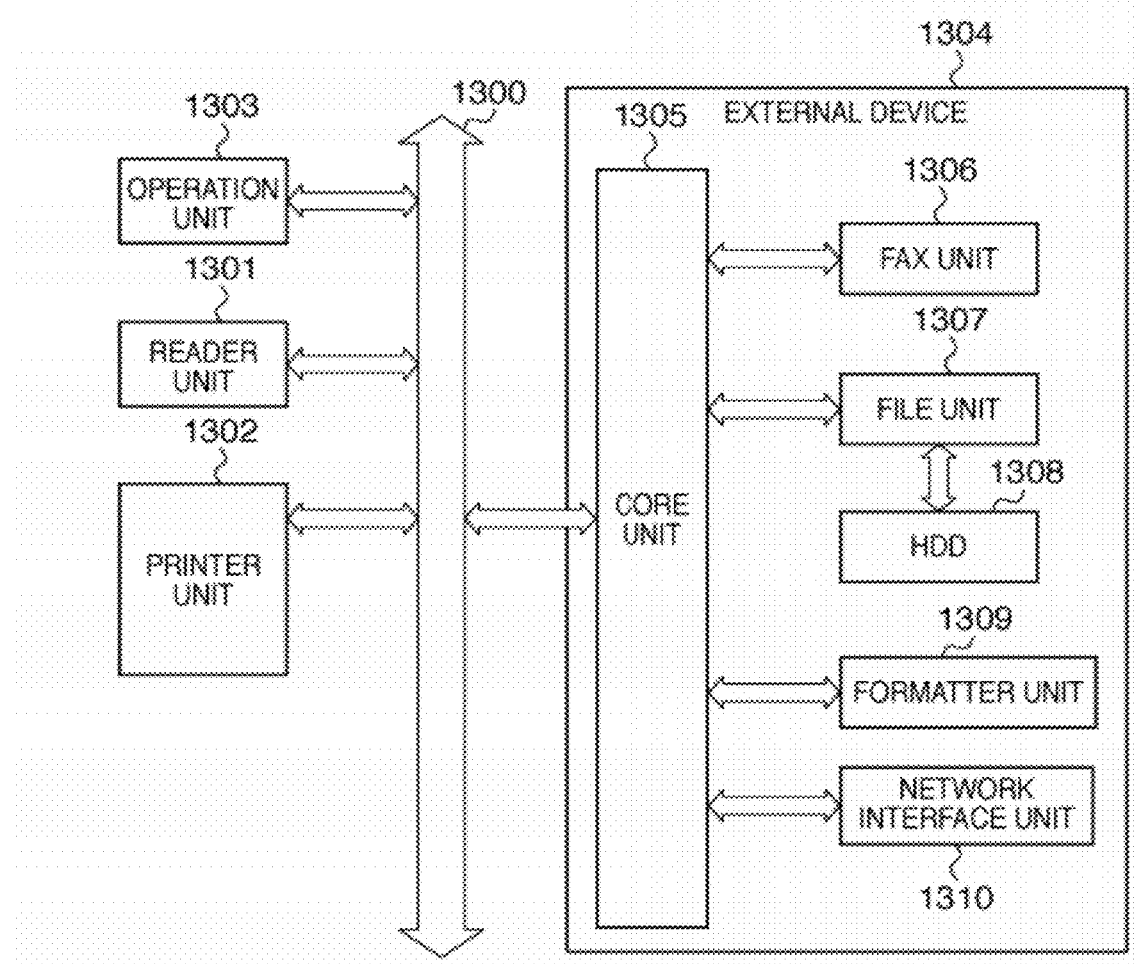
FIG. 13 is a block diagram showing the arrangement of the image forming apparatus according to the embodiment of the present invention.

FIG. 13 is a block diagram showing the arrangement of the image forming apparatus 1101-X according to the embodiment of the present invention.

Referring to FIG. 13, an image input unit (to be referred to as a reader unit hereinafter) 1301 converts a document into image data. More specifically, the image input unit 1301 causes a CCD linear image sensor or the like to photoelectrically read (scan) a document image and convert it into digital image data, and outputs the image data.

An image output unit (to be referred to as a printer unit hereinafter) 1302 has a plurality of kinds of printing paper cassettes. In accordance with a print instruction input from the reader unit 1301, the printer unit 1302 outputs image data from the reader unit 1301 onto a printing paper sheet as a visible image.

An operation unit (operation panel) 1303 inputs a print instruction to the reader unit 1301 or a process instruction to an external device 1304 electrically connected to the reader unit 1301.

The external device 1304 includes a core unit 1305, a fax unit 1306, a file unit 1307, and an external storage device (to be also referred to as an HDD hereinafter) 1308 connected to the file unit 1307. The external device 1304 also includes a formatter unit 1309 and a network interface unit 1310.

The constituent elements of the external device 1304 implement the following functions. The core unit 1305 manages the state of each constituent element of the external device 1304 and controls command input/output and image data input/output. The fax unit 1306 controls a fax function. The file unit 1307 controls a file system function of managing files stored in the external storage device (HDD) 1308. The formatter unit 1309 performs processing of converting image data information into a visible image. The network interface unit 1310 is connected to a network to execute communication processing.

A transfer bus 1300 connects the reader unit 1301, the printer unit 1302, the operation unit 1303, and the external device 1304 described above. The transfer bus 1300 includes an address bus, a data bus, an input/output bus, and a control bus.

(Functional Arrangement of Image Forming Apparatus)

FIG. 14 is a block diagram for explaining the functional arrangement of the image forming apparatus 1101-X.

A workflow association management unit 1401 provides a function of allowing a user to define or correct the process order of a plurality of workflows to be executed cooperatively. The workflow association management unit 1401 designates a preprocess workflow to be executed first in a plurality of workflows registered in advance as executable workflows. The workflow association management unit 1401 also designates a post-process workflow to be executed based on the result of the preprocess and associates the preprocess workflow and the post-process workflow with each other.

The workflow association management unit 1401 displays a user interface and registers, updates, and deletes user input data in a workflow association management database (to be referred to as a workflow association management DB 1402 hereinafter).

Figure 23:
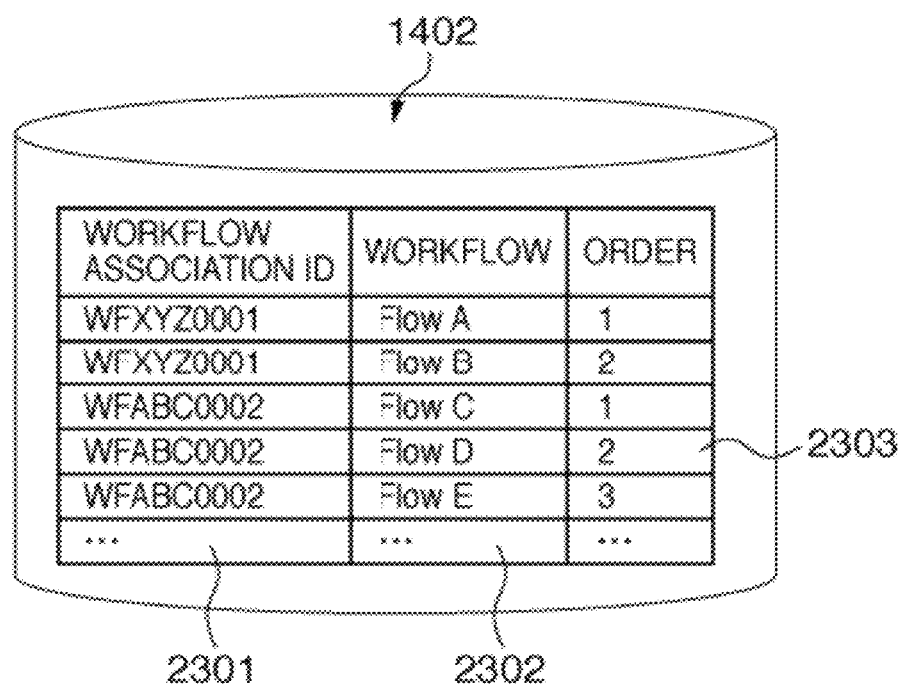
FIG. 23 is a view showing the data structure of a workflow association management DB.

FIG. 23 is a view showing the data structure of the workflow association management DB 1402. Referring to FIG. 23, a workflow association ID 2301 to identify associated workflows is identification information (ID) uniquely assigned to a group of associated workflows. Workflows having identical workflow association IDs are managed as workflows associated with each other. Workflow information 2302 uniquely indicates each workflow itself. Each workflow is uniquely specified by setting, for example, its name or ID. An order 2303 is information representing the execution order in each associated workflow group. For example, a workflow (Flow A) and a workflow (Flow B), which are associated by a workflow association ID (WFXYZ0001), have an execution order "1" and an execution order "2", respectively.

Referring back to FIG. 14, a setting item association management unit 1403 provides a function of allowing a user to define or correct the content settings of setting items of work items that constitute each workflow and association between the setting items. The setting item association management unit 1403 designates a setting item to execute a function corresponding to a work item and associates the designated setting item between a plurality of work items. The setting item association management unit 1403 displays a user interface and registers, updates, and deletes user input data in a setting item association management database (to be referred to as a setting item association management DB 1404 hereinafter). Processing of the setting item association management unit 1403 enables to define each of the functions of the image forming apparatus such as scan, copy, print, data storage, and send as one work item and define one workflow by combining the work items.

Figure 22:
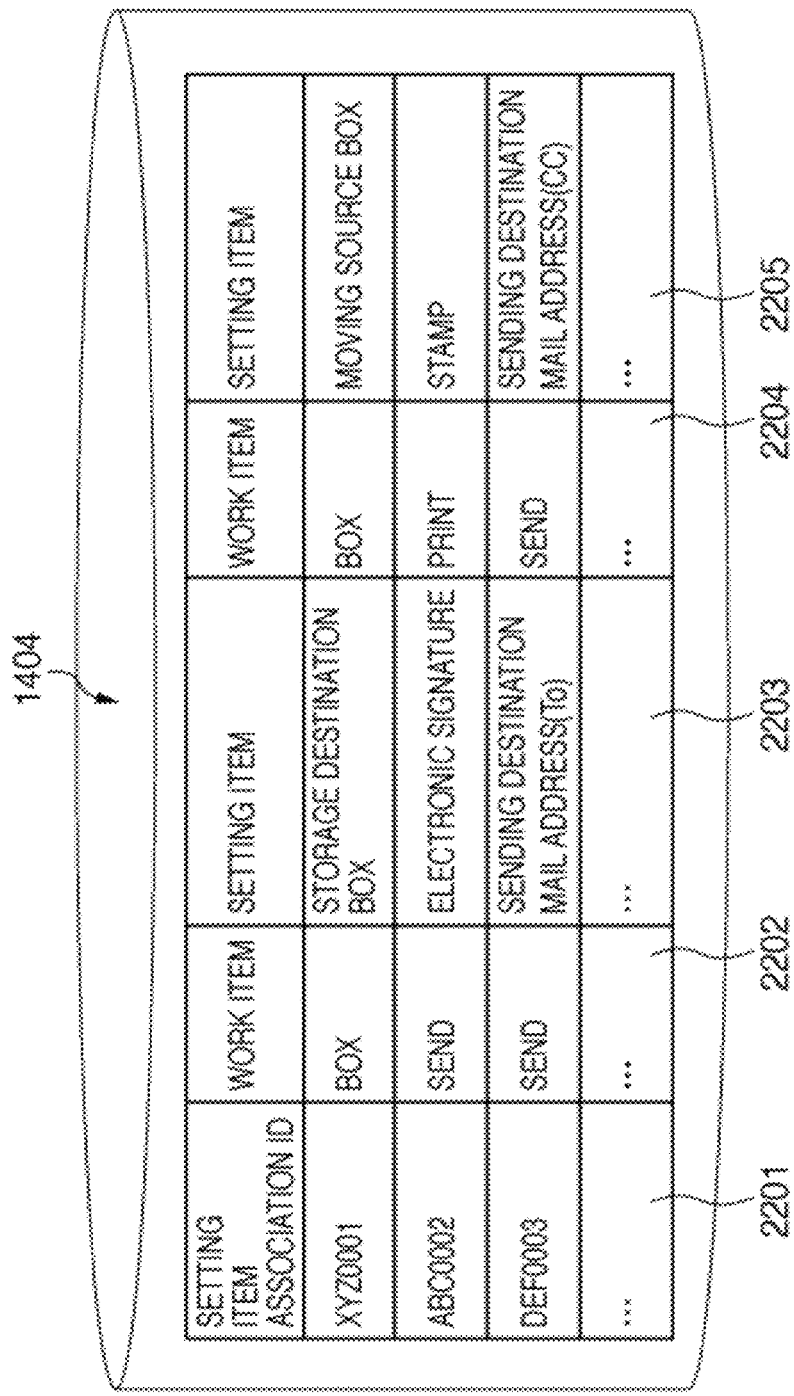
FIG. 22 is a view showing the data structure of a setting item association management DB according to the first embodiment.

FIG. 22 is a view showing the data structure of the setting item association management DB 1404. Referring to FIG. 22, a setting item association ID 2201 is uniquely assigned to one association between one work item setting item and another work item setting item. For example, the setting item association management unit 1403 assigns and sets one setting item association ID (ABC0002) to the association between "electronic signature" of work item "send" and "stamp" of work item "print".

Work item information 2202 uniquely specifies a work item. The contents of the work item information 2202 can be specified by information such as a name or an ID. Setting item information 2203 uniquely specifies the contents of a setting item. The contents of the setting item information 2203 can be specified by information such as a name or an ID.

Work item information 2204 uniquely specifies a work item associated with the setting item information 2203 corresponding to the work item information 2202. The contents of the work item information 2204 can be specified by information such as a name or an ID.

Setting item information 2205 uniquely specifies the contents of a setting item corresponding to the work item information 2204 associated with the setting item information 2203 corresponding to the work item information 2202. The contents of the setting item information 2205 can be specified by information such as a name or an ID.

Referring back to FIG. 14, a setting change item display unit 1405 controls the display of a setting window to change the settings of a work item in a post-process workflow after execution of a preprocess workflow. The setting change item display unit 1405 functions as a setting change reception unit which receives a setting change for a setting item of a work item constituting a preprocess workflow. The setting change item display unit 1405 then reflects the contents of the setting change on a setting item of a work item that constitutes a post-process workflow and is associated with the changed setting item by the setting item association management unit 1403.

A preprocess data generation unit 1406 generates data which contains the preprocess workflow execution result and the setting change contents reflected by the setting change item display unit 1405 (setting change reception unit). The preprocess data generation unit 1406 notifies the post-process workflow of the preprocess workflow execution result and the setting change contents. Notification of the preprocess workflow execution result and the setting change contents is done in accordance with the following procedure. First, after execution of the preprocess workflow, the preprocess data generation unit 1406 generates intermediate data representing the preprocess workflow processing result. The preprocess data generation unit 1406 issues (generates) identification information (task flow ID) for specifying the intermediate data to enable cooperative execution of the preprocess and post-process. The preprocess data generation unit 1406 embeds, in the intermediate data, the task flow ID and a result of reflection of the contents of the setting change for the setting item of the preprocess on the associated setting item of the post-process. The preprocess data generation unit 1406 transfers the intermediate data as transfer data to the post-process workflow. With this processing, the post-process workflow is notified of the contents of the setting change for the setting item of the post-process workflow.

A post-process data analysis unit 1407 reads out the intermediate data transferred from the preprocess and analyzes the task flow ID and the contents of the setting change of the work item. Based on the intermediate data generated by the preprocess data generation unit 1406, the post-process data analysis unit 1407 analyzes whether a setting change has been done for a setting item of a work item that constitutes the post-process workflow.

If the preprocess workflow is executed a plurality of number of times, the preprocess data generation unit 1406 generates a plurality of intermediate data corresponding to a plurality of execution results.

A post-process data selection unit 1408 selects one intermediate data to be used to execute the post-process workflow from the plurality of intermediate data obtained by executing the preprocess workflow a plurality of number of times. If there are a plurality of intermediate data transferred from the preprocess at the time of execution of the post-process workflow, the post-process data selection unit 1408 causes the user to select intermediate data to be processed. More specifically, the post-process data selection unit 1408 displays the list of intermediate data on a user interface and causes the user to select arbitrary intermediate data from the list. The intermediate data selected by the user is used as input data when executing the post-process workflow.

A workflow execution unit 1409 can control execution of the post-process workflow based on the analysis result from the post-process data analysis unit 1407. The workflow execution unit 1409 executes a workflow in accordance with workflow information managed in a workflow management database (to be referred to as a workflow management DB 1410 hereinafter). The workflow execution unit 1409 executes the post-process workflow while temporarily reflecting the setting change contents analyzed by the post-process data analysis unit 1407 on the workflow.

A workflow management unit 1411 provides a function of allowing a user to define or correct a workflow by, for example, setting the execution order of work items and processing of each item. Each workflow defined by the workflow management unit 1411 is registered in the workflow management DB 1410.

Processing concerning the workflow management unit 1411 and the workflow management DB 1410 is implemented by an existing technique. Hence, a detailed description of the processing will be omitted. Processing concerning the workflow association management unit 1401 to the workflow execution unit 1409 will be explained below.

(Setting Item Association)

Figure 15A:
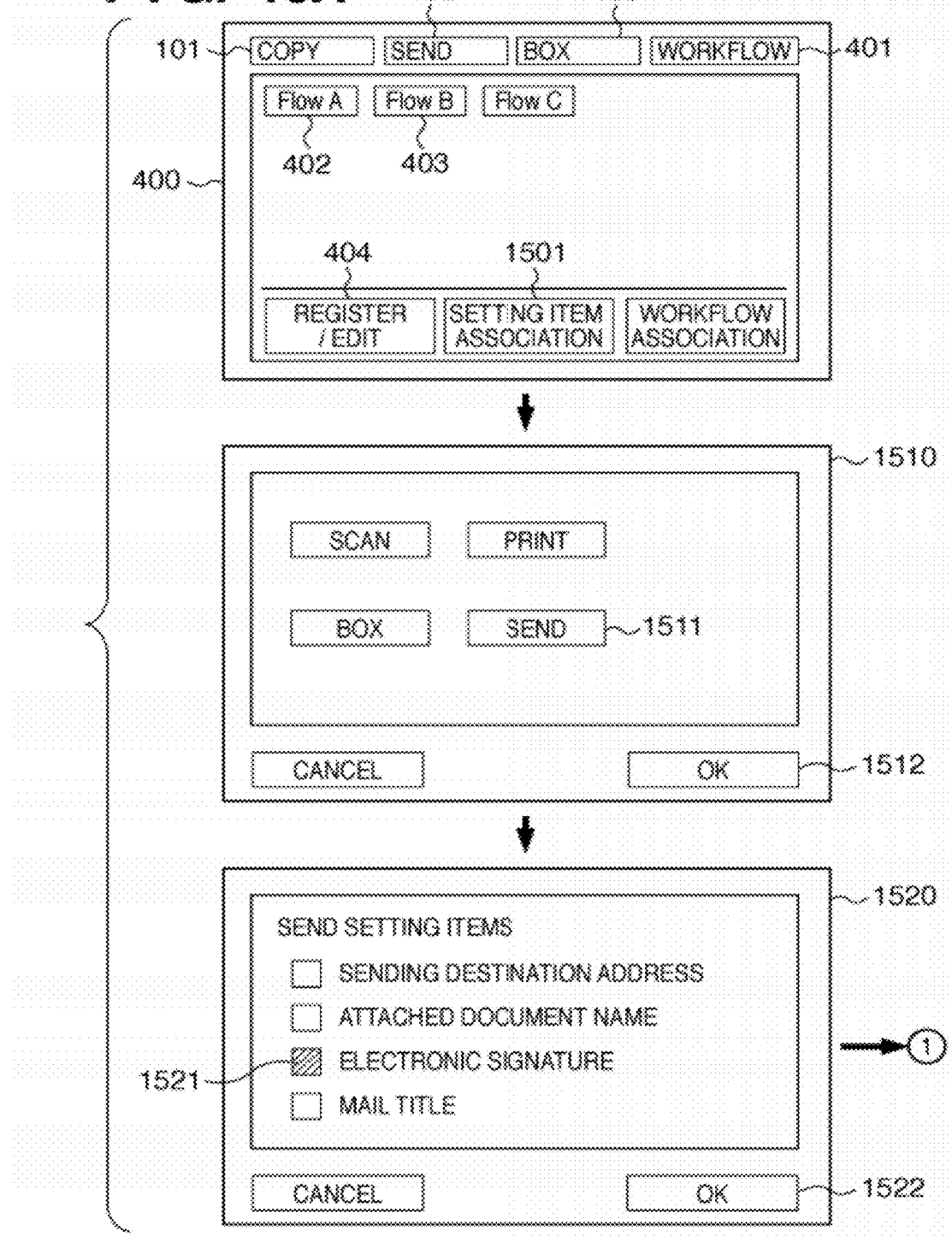
FIGS. 15A and 15B are views for explaining an operation procedure when a workflow manager or a user associates the setting items of work items on the operation unit of the image forming apparatus.
Figure 15B:
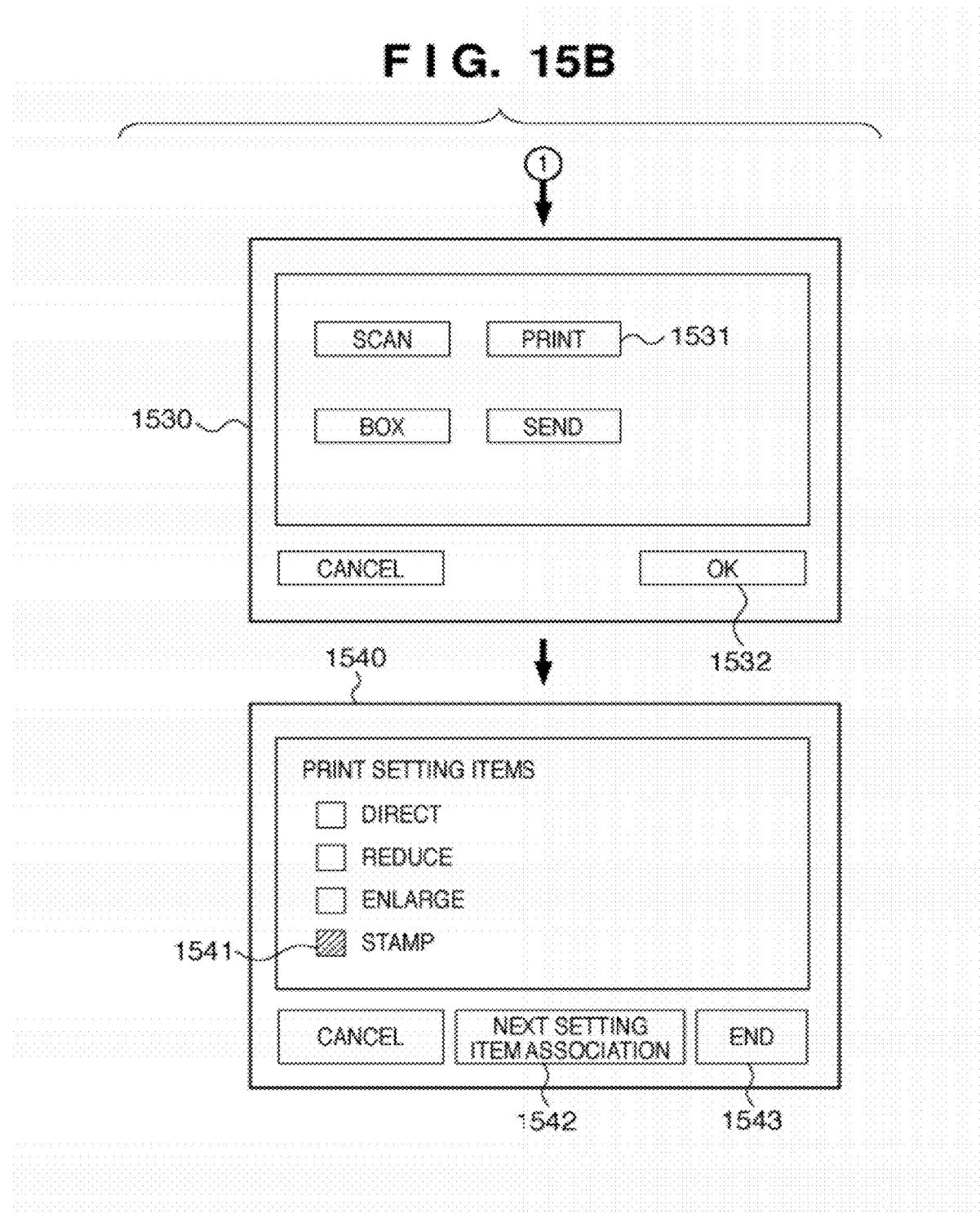

FIGS. 15A and 15B are views for explaining an operation procedure when a workflow manager or a user associates the setting items of work items on the operation unit 1303 of the image forming apparatus 1101-X. The same reference numerals as in FIG. 4 denote the same constituent elements in FIGS. 15A and 15B, and a description thereof will not be repeated.

When the workflow manager presses a setting item association button 1501 on the workflow management window 400, an association source work item selection window 1510 is displayed. On the association source work item selection window 1510, the workflow manager selects a button (send button 1511 in FIG. 15A) corresponding to a work item including a setting item to be associated. Then, the workflow manager presses an OK button 1512 to display an association source setting item selection window 1520. The association source setting item selection window 1520 displays a setting item list, and the workflow manager selects an arbitrary setting item (selects a setting item "electronic signature" 1521 in FIG. 15A). The workflow manager presses an OK button 1522 to display an association destination work item selection window 1530. On the association destination work item selection window 1530, the workflow manager selects a button (print button 1531 in FIG. 15B) corresponding to a work item including a setting item to be associated. The workflow manager presses an OK button 1532 to display an association destination setting item selection window 1540. The association destination setting item selection window 1540 displays a setting item list, and the workflow manager selects an arbitrary setting item (selects a setting item "stamp" 1541 in FIG. 15B). To continue setting item association, the workflow manager presses a next setting item association button 1542. When the workflow manager presses the next setting item association button 1542, the association source work item selection window 1510 is displayed again. To end setting item association, the workflow manager presses an end button 1543.

Figure 16:
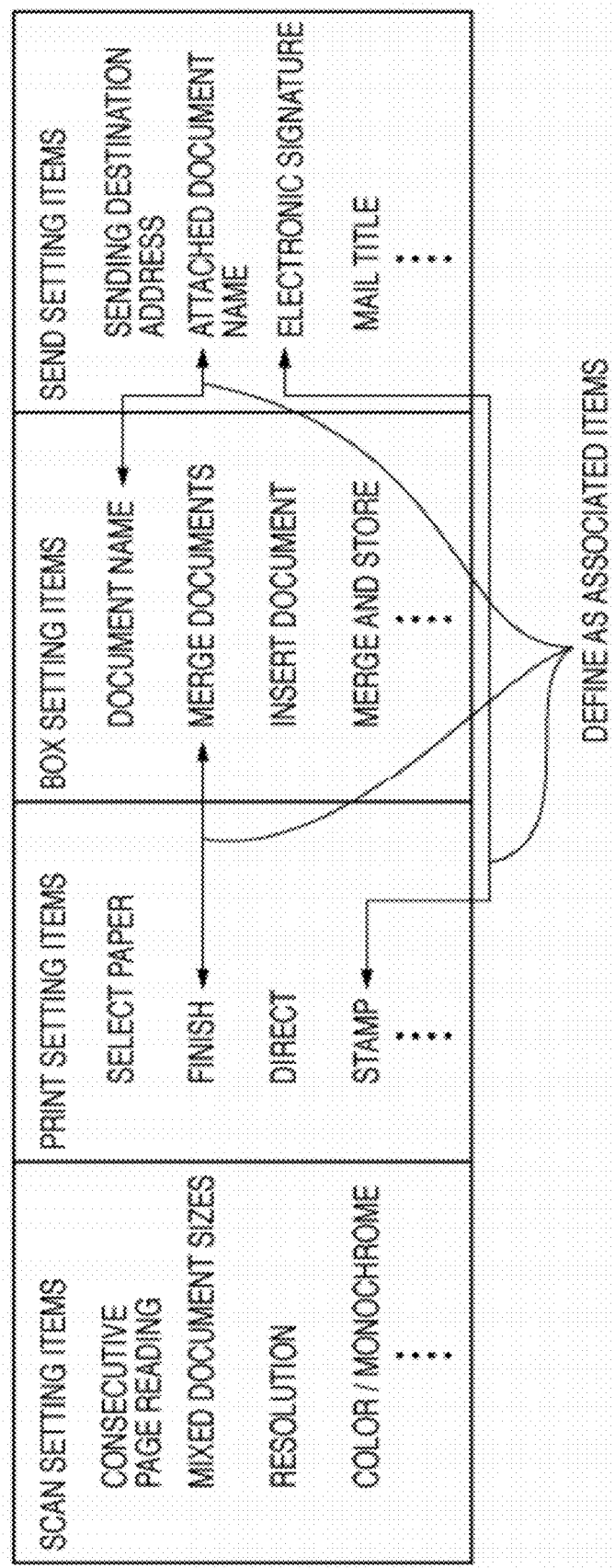
FIG. 16 is a view showing the association result of the setting items of work items according to the first embodiment.

Associating setting items in the preprocess and post-process in accordance with the operation procedure shown in FIGS. 15A and 15B enables setting item association as shown in FIG. 16. In FIG. 16, the setting item "electronic signature" of the work item "send" and the setting item "stamp" of the work item "print" are associated with each other. Additionally, the setting item "merge documents" of the work item "box" and the setting item "finish" of the work item "print" are associated with each other. Furthermore, the setting item "document name" of the work item "box" and the setting item "attached document name" of the work item "send" are associated with each other.

According to this embodiment, it is possible to associate the setting items of work items and associate workflows. These associations enable the following when the settings of a preprocess workflow have been changed.

For example, assume a case in which the setting item "electronic signature" of the work item "send" and the setting item "stamp" of the work item "print" are associated with each other, as shown in FIG. 16. Assume that when executing a preprocess workflow "Flow A", user A changes the setting item "electronic signature" of the work item "send" from "off" to "on". At this time, the association enables to change the setting item "stamp" of the work item "print" in a post-process workflow "Flow B" from "no stamp" to "print 'classified'". From then on, "classified" is printed on a classified document without causing user B, who is in charge of the post-process workflow and does not directly see the document upon scan, to be aware of it.

(Workflow Association)

FIG. 17 is a view for explaining an operation procedure when a workflow manager or a user associates workflows on the operation unit 1303 of the image forming apparatus 1101-X. The same reference numerals as in FIG. 4 denote the same constituent elements in FIG. 17, and a description thereof will not be repeated.

When the workflow manager presses a workflow association button 1702 on the workflow management window 400, an association workflow selection window 1710 is displayed. On the association workflow selection window 1710, the workflow manager selects a button ("Flow A" workflow execution button 402 in FIG. 17) corresponding to a workflow to be executed first. When the workflow manager selects the button corresponding to the workflow, an icon "Flow A" 1711 representing the selected workflow is displayed in the "workflow association" display area on the lower side of the association workflow selection window 1710. Next, the workflow manager selects a button ("Flow B" workflow execution button 403 in FIG. 17) corresponding to a workflow to be executed second. When the workflow manager selects the button corresponding to the workflow, an icon "Flow B" 1721 representing the selected workflow is displayed in the "workflow association" display area on the lower side of an association workflow selection window 1720. At this time, the icon "Flow A" 1711 and the icon "Flow B" 1721 may be connected by an arrow to indicate their execution orders. Similarly, the workflow manager presses a button corresponding to a workflow to be next, thereby associating in the workflows. To end workflow association, the workflow manager presses an end button 1722.

Figure 18A:
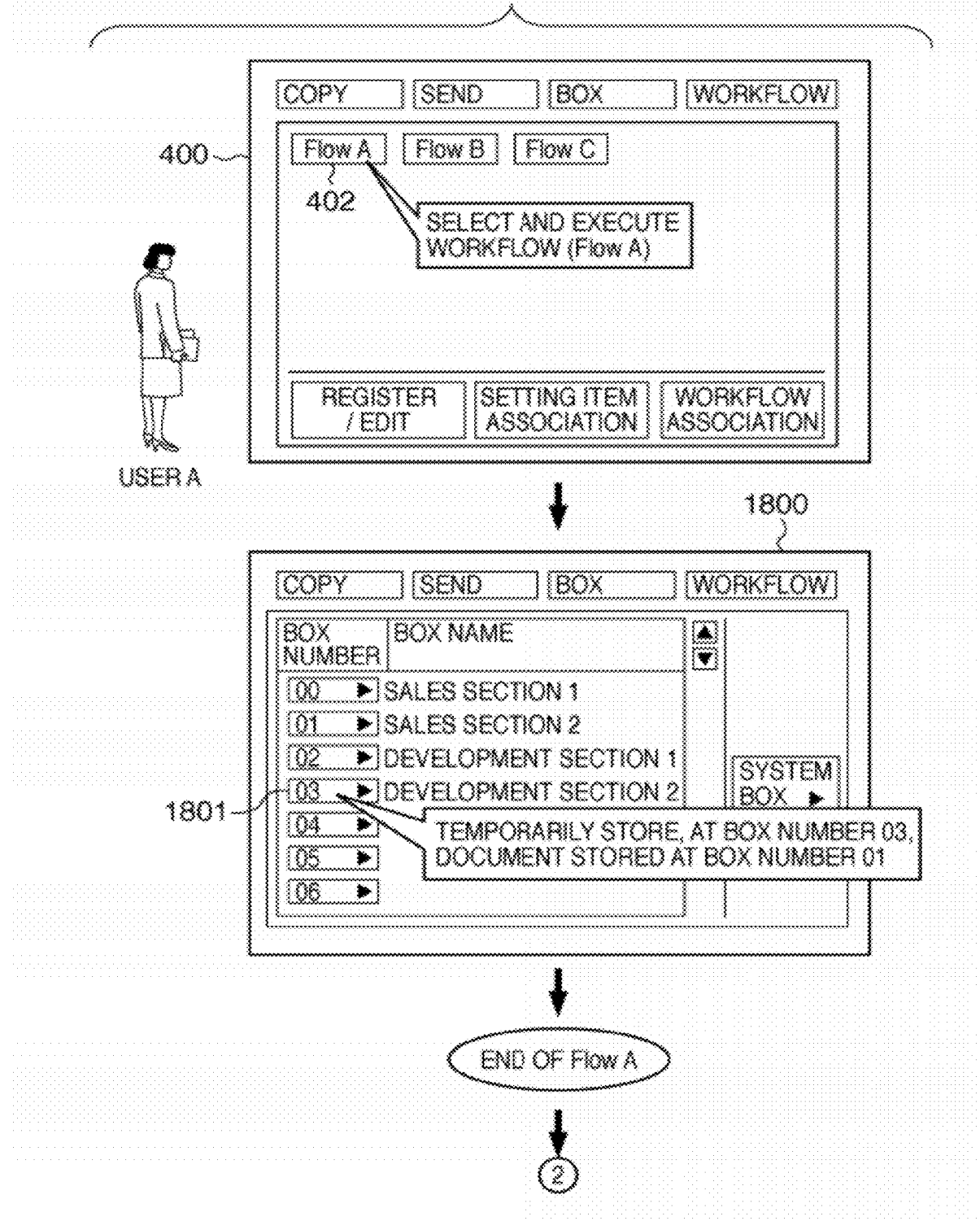
FIGS. 18A and 18B are views for explaining an operation procedure when a user executes a preprocess workflow on the operation unit of the image forming apparatus.
Figure 18B:
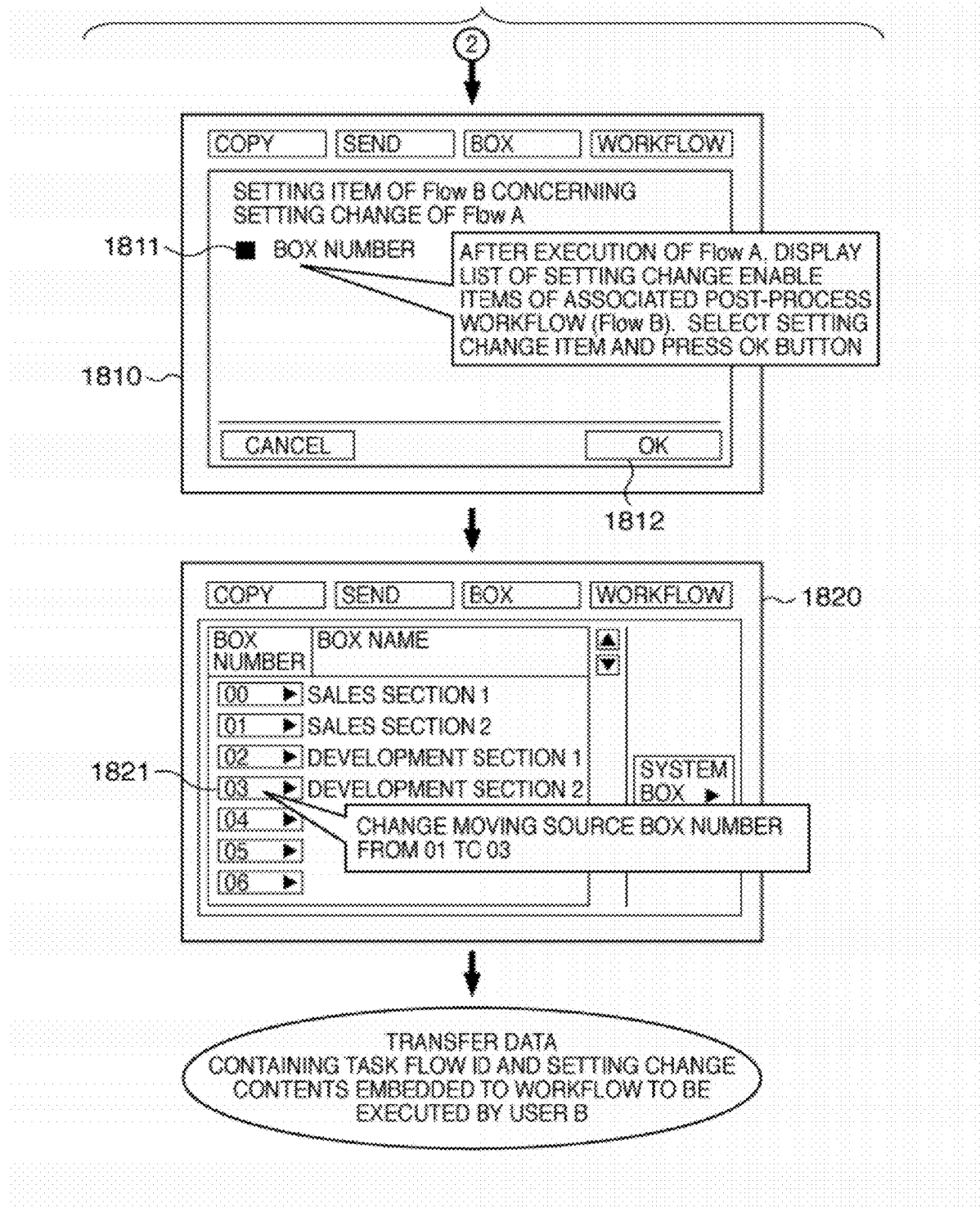

FIGS. 18A and 18B are views for explaining an operation procedure when a user executes a preprocess workflow on the operation unit 1303 of the image forming apparatus 1011 (X). Assume that following setting items (1) and (2) are associated with each other.

(1) A setting item "box number of storage destination box" of the work item "box" of the preprocess workflow "Flow A"

(2) A setting item "box number of moving source box" of the work item "box" of the post-process workflow "Flow B"

When user A who is in charge of the preprocess workflow presses, on the workflow management window 400, the button ("Flow A" workflow execution button 402 in FIG. 17) corresponding to the workflow to be executed, the workflow is executed. For example, when the user presses a button 1801 of box number 03 on a box management window 1800 which is a window displayed during workflow execution, the storage destination box changes from the box having box number 01 to the box having box number 03.

The preprocess workflow "Flow A" is directly executed and ended. When the preprocess workflow "Flow A" has ended, a setting item list window 1810 of the post-process workflow "Flow B" concerning a setting change is displayed. To change settings, user A marks a setting item check box 1811 on the setting item list window 1810 and presses an OK button 1812. Then, a box management window 1820 for the work item "box" of the post-process workflow "Flow B" is displayed. User A presses a button 1821 of box number 03 and sets to change the moving source box from the box having box number 01 to the box having box number 03.

FIG. 19 is a view for explaining an operation procedure when the user executes a post-process workflow on the operation unit 1303 of the image forming apparatus 1011 (X).

User B who is in charge of the post-process workflow presses, on the workflow management window 400, the button ("Flow B" workflow execution button 403 in FIG. 19) corresponding to the workflow to be executed. If data transferred from the preprocess workflow exists, a preprocess workflow data list window 1900 is displayed. User B selects an arbitrary one (in FIG. 19, data 1901 from "Flow A" executed by user A) of data from the data list displayed on the preprocess workflow data list window 1900, and presses an OK button 1902. User B thus executes "Flow B" while temporarily reflecting the contents of the setting change by user A.

(Processing of Setting Item Association Management Unit 1403)

Figure 20:
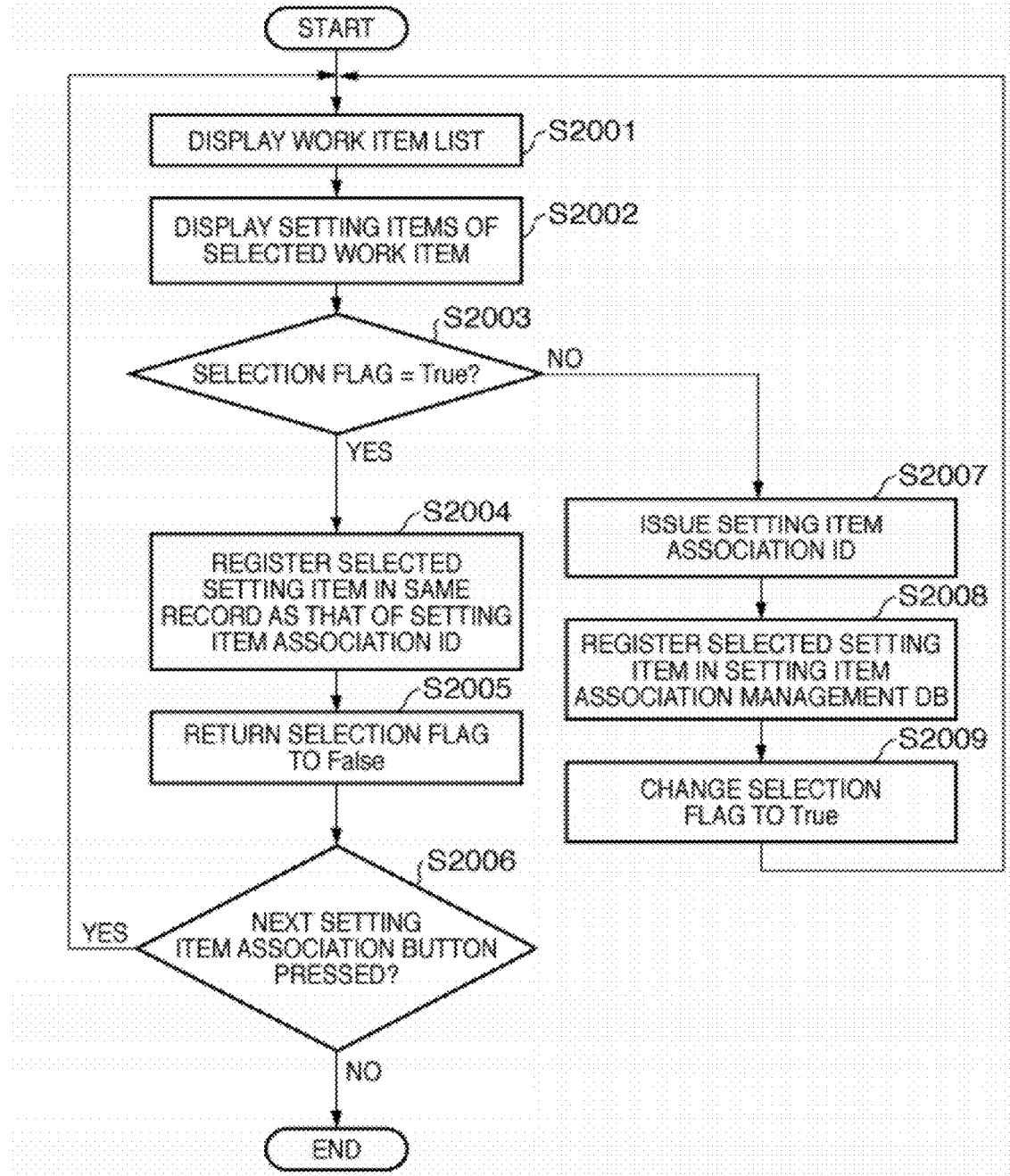
FIG. 20 is a flowchart for explaining the procedure of processing of a setting item association management unit when associating setting items.

FIG. 20 is a flowchart for explaining the procedure of processing of the setting item association management unit 1403 when associating setting items.

In step S2001, the setting item association management unit 1403 obtains the function information of the image forming apparatus 1101-X such as copy, scan, box, and send. The setting item association management unit 1403 displays the obtained information as a list of work items on the association source work item selection window 1510.

In step S2002, the setting item association management unit 1403 obtains the setting item information of a work item selected by the user on the association source work item selection window 1510, and displays a list on the association source setting item selection window 1520.

In step S2003, the setting item association management unit 1403 determines, by referring to a selection flag, whether each setting item of the association source work item has already been selected. If the selection flag is True, the setting item is determined as "selected". If the selection flag is False, the setting item is determined as "unselected".

If the selection flag is True, the process advances to step S2004. If the selection flag is False, the process advances to step S2007.

In step S2007, since the setting item is unselected, the setting item association management unit 1403 issues a new setting item association ID to register new association information in the setting item association management DB 1404.

In step S2008, the setting item association management unit 1403 registers, in the setting item association management DB 1404, the setting item association ID and the information obtained in steps S2001 and S2002. At this time, the setting item association ID is registered as the setting item association ID 2201 in the setting item association management DB 1404. Each work item obtained in step S2001 is registered as the work item information 2202 uniquely representing a work item in the setting item association management DB 1404. Each setting item obtained in step S2002 is registered as the setting item information 2203 uniquely representing a setting item in the setting item association management DB 1404.

In step S2009, the setting item association management unit 1403 updates the selection flag to True to make the setting item of the association source work item "selected".

In step S2004, since the setting item of the association source work item has already been selected, the setting item association management unit 1403 refers to the setting item association management DB 1404. The setting item association management unit 1403 registers the following information in the same record as that of the setting item association ID 2201 in the setting item association management DB 1404 and the setting item association ID issued in step S2007.

The setting item association management unit 1403 registers, in the same record as that of the setting item association ID 2201, the work item information 2204 and the setting item information 2205 associated with the work item information 2202 and the setting item information 2203.

In step S2005, since the setting item association has ended, the setting item association management unit 1403 updates the selection flag to False to make the setting item of the association source work item "unselected".

In step S2006, if the next setting item association button is pressed, the setting item association management unit 1403 returns the process to step S2001. On the other hand, if the next setting item association button is not pressed, the setting item association management unit 1403 ends the processing.

(Processing of Workflow Association Management Unit 1401)

Figure 21:
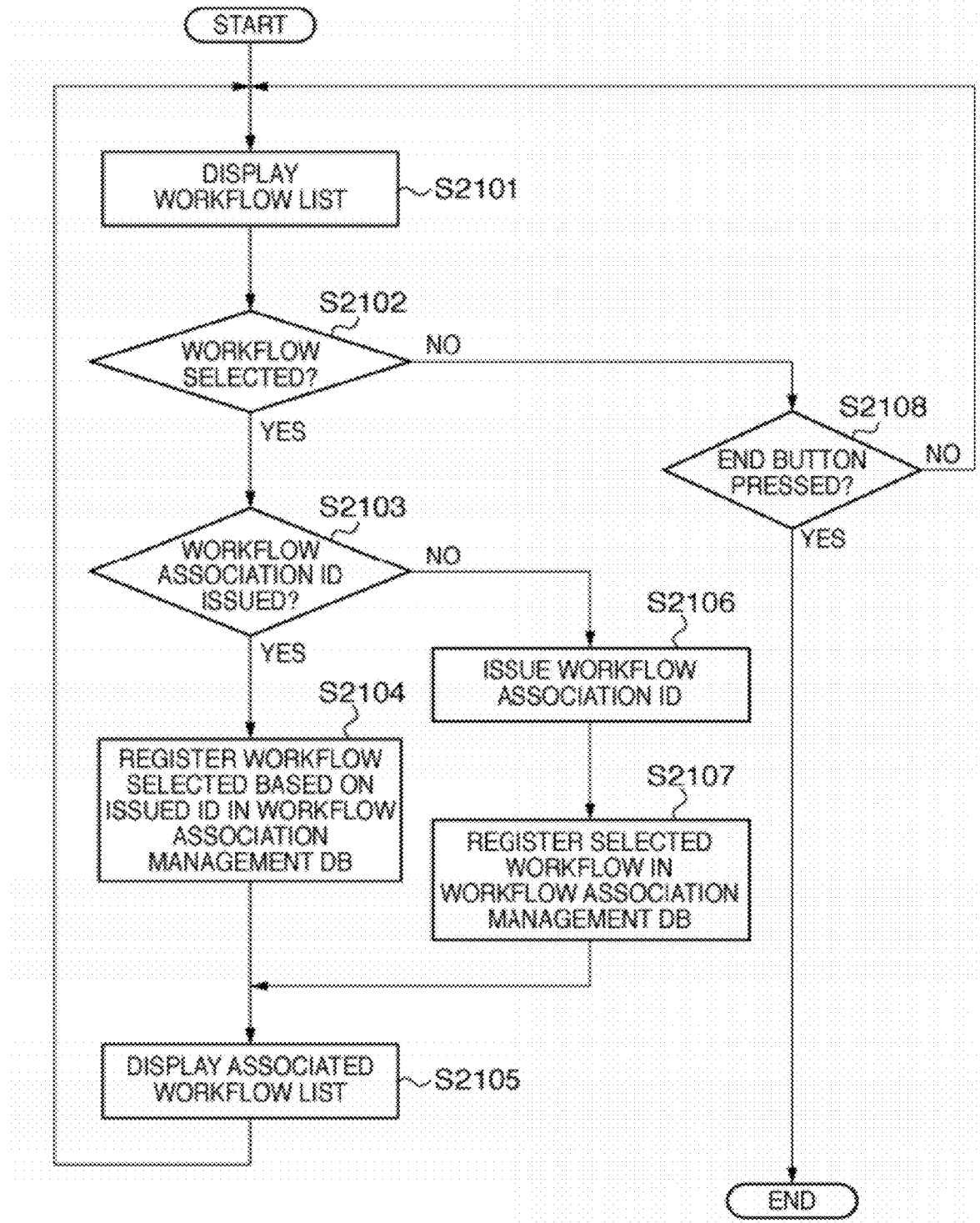
FIG. 21 is a flowchart for explaining the procedure of processing of a workflow association management unit when associating workflows.

FIG. 21 is a flowchart for explaining the procedure of processing of the workflow association management unit 1401 when associating workflows.

In step S2101, the workflow association management unit 1401 refers to the workflow management DB 1410 and obtains an already defined workflow list. The workflow association management unit 1401 displays the obtained workflow list as the workflow execution buttons 402, 403, and 1701 on the upper side of the association workflow selection window 1710.

In step S2102, the workflow association management unit 1401 determines the presence/absence of selection of a workflow. If an arbitrary workflow is selected by user input, the process advances to step S2103. If no workflow is selected, the process advances to step S2108.

In step S2103, the workflow association management unit 1401 determines whether a workflow association ID has already been issued. If a workflow association ID has already been issued, the process advances to step S2104. If a workflow association ID has not been issued yet, the process advances to step S2106.

In step S2106, the workflow association management unit 1401 issues a workflow association ID.

In step S2107, the workflow association management unit 1401 registers, in the workflow association management DB 1402, the information of the workflow selected in step S2102 and the workflow association ID issued in step S2106. The order 2303 upon registration is set to "1".

In step S2104, the workflow association management unit 1401 registers, in the workflow association management DB 1402, the information of the workflow selected in step S2102 based on the workflow association ID issued in step S2106. The order 2303 upon registration takes a value obtained by adding "1" to the maximum value of the order 2303 out of records having the same workflow association ID and registered in the workflow association management DB 1402. For example, if "1" is already registered (set) as the order 2303, "2" is obtained by adding "1" and registered (set) as the order 2303.

In step S2105, the workflow association management unit 1401 refers to the workflow association management DB 1402, and obtains workflow information having the same workflow association ID 2301 as the workflow association ID issued in step S2106. The workflow association management unit 1401 arranges the pieces of obtained workflow information in ascending order of the order 2303. The workflow association management unit 1401 displays them as workflow association information on the lower side of the association workflow selection window 1710.

In step S2108, if the user presses the end button 1722 on the association workflow selection window 1710, the workflow association management unit 1401 ends the processing. If the end button 1722 is not pressed, the workflow association management unit 1401 returns the process to step S2101 to repeat the same processing as described above.

(Processing of Executing Preprocess Workflow of Associated Workflows)

Figure 24:
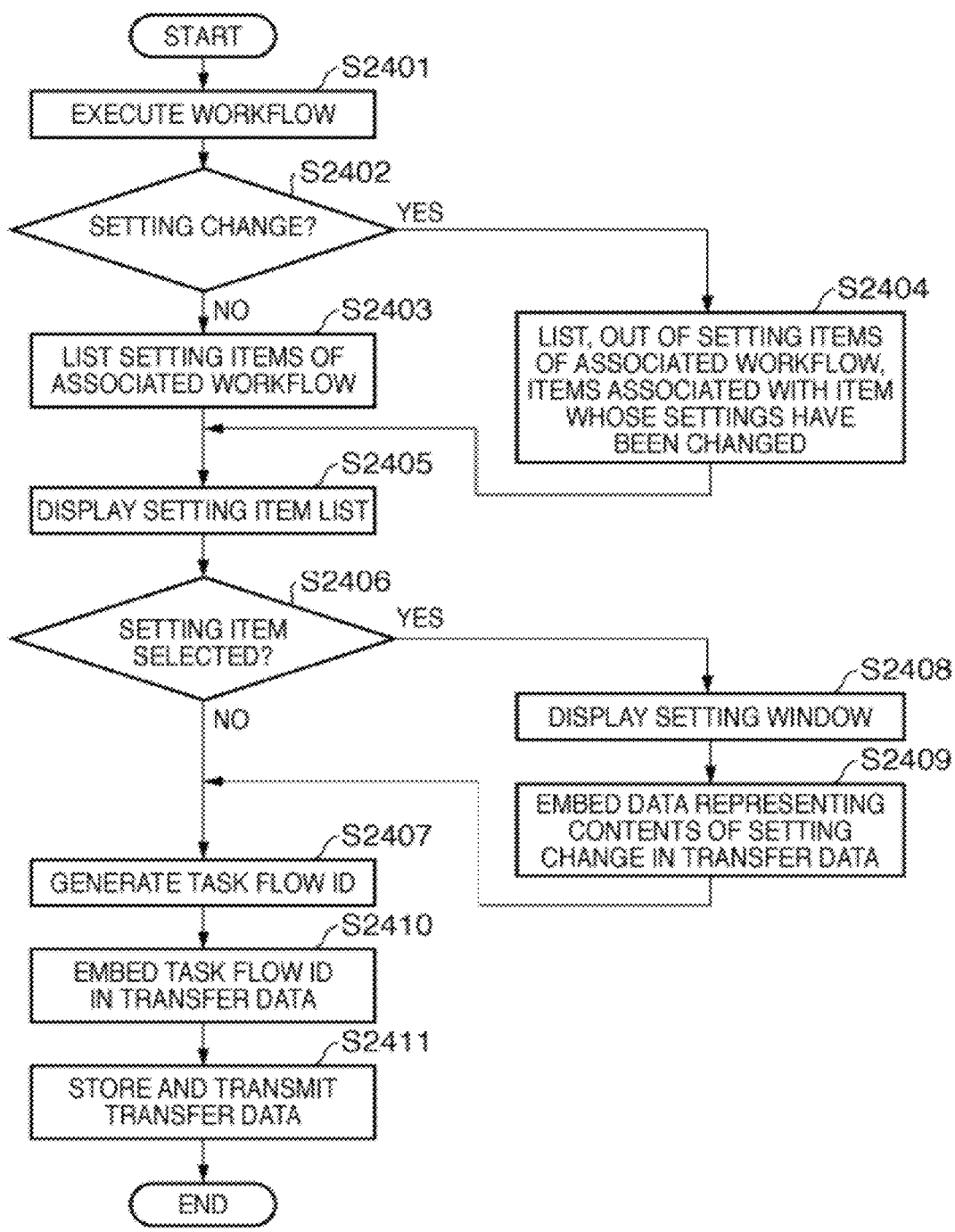
FIG. 24 is a flowchart for explaining the procedure of processing of executing the preprocess workflow of associated workflows.

FIG. 24 is a flowchart for explaining the procedure of processing of executing the preprocess workflow of associated workflows.

In step S2401, the workflow execution unit 1409 executes a workflow designated by the user.

In step S2402, if a setting change has been done during workflow execution in step S2401, the workflow execution unit 1409 notifies the setting change item display unit 1405 of the changed setting item.

In step S2403, the setting change item display unit 1405 refers to the workflow association management DB 1402 and obtains an associated workflow. The setting change item display unit 1405 then obtains all setting items of work items that constitute the associated workflow. The process in step S2403 assumes a case in which a setting change can be done for a post-process workflow even without any setting change for a preprocess workflow. If the preprocess workflow has not undergone a setting change, and the post-process workflow requires no setting change either, the processing may end without executing step S2403.

In step S2404, the setting change item display unit 1405 refers to the workflow association management DB 1402 and obtains an associated workflow. The setting change item display unit 1405 refers to the setting item association management DB 1404 using, as keys, the associated workflow and the setting item obtained in step S2402. The setting change item display unit 1405 thus obtains setting items of the post-process workflow associated with the setting item received in step S2402.

In step S2405, the setting change item display unit 1405 displays the obtained setting item on the setting item list window 1810.

In step S2406, if a setting item is selected by user input for a setting change in the post-process workflow, the setting change item display unit 1405 advances the process to step S2408. Otherwise, the process advances to step S2407.

In step S2408, the setting change item display unit 1405 displays a setting window for the setting item subjected to the setting change.

In step S2409, the setting change item display unit 1405 notifies the preprocess data generation unit 1406 of the setting contents changed on the setting window by user input. Upon receiving the setting contents, the preprocess data generation unit 1406 embeds information representing the contents of the setting change in intermediate data (transfer data) representing the processing result of the workflow executed in step S2401.

In step S2407, the preprocess data generation unit 1406 generates identification information (task flow ID) to specify the intermediate data.

In step S2410, the preprocess data generation unit 1406 embeds the task flow ID in the intermediate data (transfer data).

In step S2411, the preprocess data generation unit 1406 stores and transmits the intermediate data (transfer data), and transfers, to the post-process workflow, the intermediate data (transfer data) containing the setting change contents embedded in the processing result of the preprocess.

(Processing of Executing Associated Post-Process Workflow)

Figure 25:
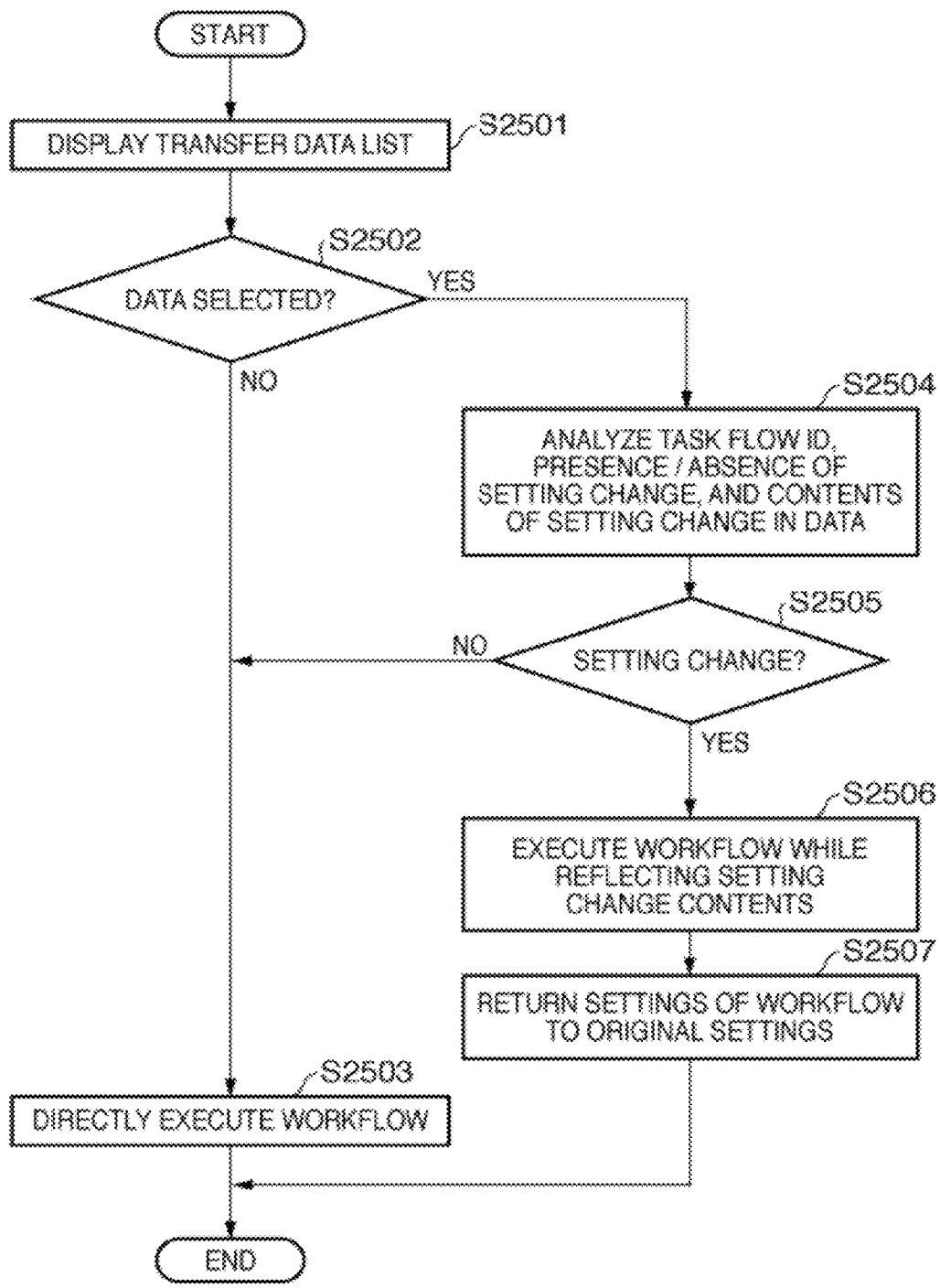
FIG. 25 is a flowchart for explaining the procedure of processing of executing an associated post-process workflow.

FIG. 25 is a flowchart for explaining the procedure of processing of executing an associated post-process workflow.

In step S2501, the post-process data selection unit 1408 refers to the storage location of data to be input as a post-process workflow, and obtains a list of data transferred from the preprocess. The post-process data selection unit 1408 displays the obtained list on the preprocess workflow data list window 1900.

In step S2502, the post-process data selection unit 1408 determines whether data in the data list on the preprocess workflow data list window 1900 is selected by user input. If data is selected, the post-process data selection unit 1408 notifies the post-process data analysis unit 1407 of the selected data and advances the process to step S2504. If no data is selected, the post-process data selection unit 1408 requests the workflow execution unit 1409 to execute the workflow and advances the process to step S2503.

In step S2504, the post-process data analysis unit 1407 analyzes the selected data received from the post-process data selection unit 1408 and confirms the task flow ID and the presence/absence of a setting change. If a setting change exists, the post-process data analysis unit 1407 analyzes setting change information representing the contents of the setting change.

In step S2505, if the analysis result of the post-process data analysis unit 1407 in step S2504 indicates existence of a setting change, the process advances to step S2506. Without any setting change, the post-process data analysis unit 1407 requests the workflow execution unit 1409 to execute the workflow and advances the process to step S2503.

In step S2506, the post-process data analysis unit 1407 notifies the workflow execution unit 1409 of the contents of the setting change. Upon receiving the setting change contents, the workflow execution unit 1409 executes the workflow while reflecting the setting change contents.

In step S2507, the workflow execution unit 1409 returns the changed settings to the original settings after execution of the workflow and ends the processing. The workflow execution unit 1409 can return the changed settings to the original settings by deleting the information representing the contents of the setting change.

On the other hand, if no data is selected in step S2502, or it is determined in step S2505 that no setting change exists, the process advances to step S2503. In step S2503, the workflow execution unit 1409 directly executes the workflow and ends the processing.

According to this embodiment, it is possible to flexibly change the setting contents of a workflow even when a plurality of users execute different workflows to complete one task.

A preprocess workflow execution user who does not execute a post-process workflow can change the setting contents of the post-process workflow associated with setting contents changed in the preprocess workflow. The changed setting contents are temporarily reflected when executing the post-process workflow.

This makes it unnecessary to correct and edit the post-process workflow each time even when the user wants to temporarily change the setting contents of the preprocess workflow. In addition, the post-process workflow execution user can execute the workflow without awareness of the changed contents of the preprocess, resulting in an increase in user convenience.

Second Embodiment

In the first embodiment, preprocess user A designates a setting change for a work item that constitutes a post-process workflow. At this time, if post-process user B changes the settings of the same setting item when executing the post-process workflow, the contents of the setting change by user A are lost. In view of this problem, an arrangement will be described in the second embodiment which allows preprocess user A to designate whether to enable a setting change for a work item that constitutes a post-process workflow.

Figure 26A:
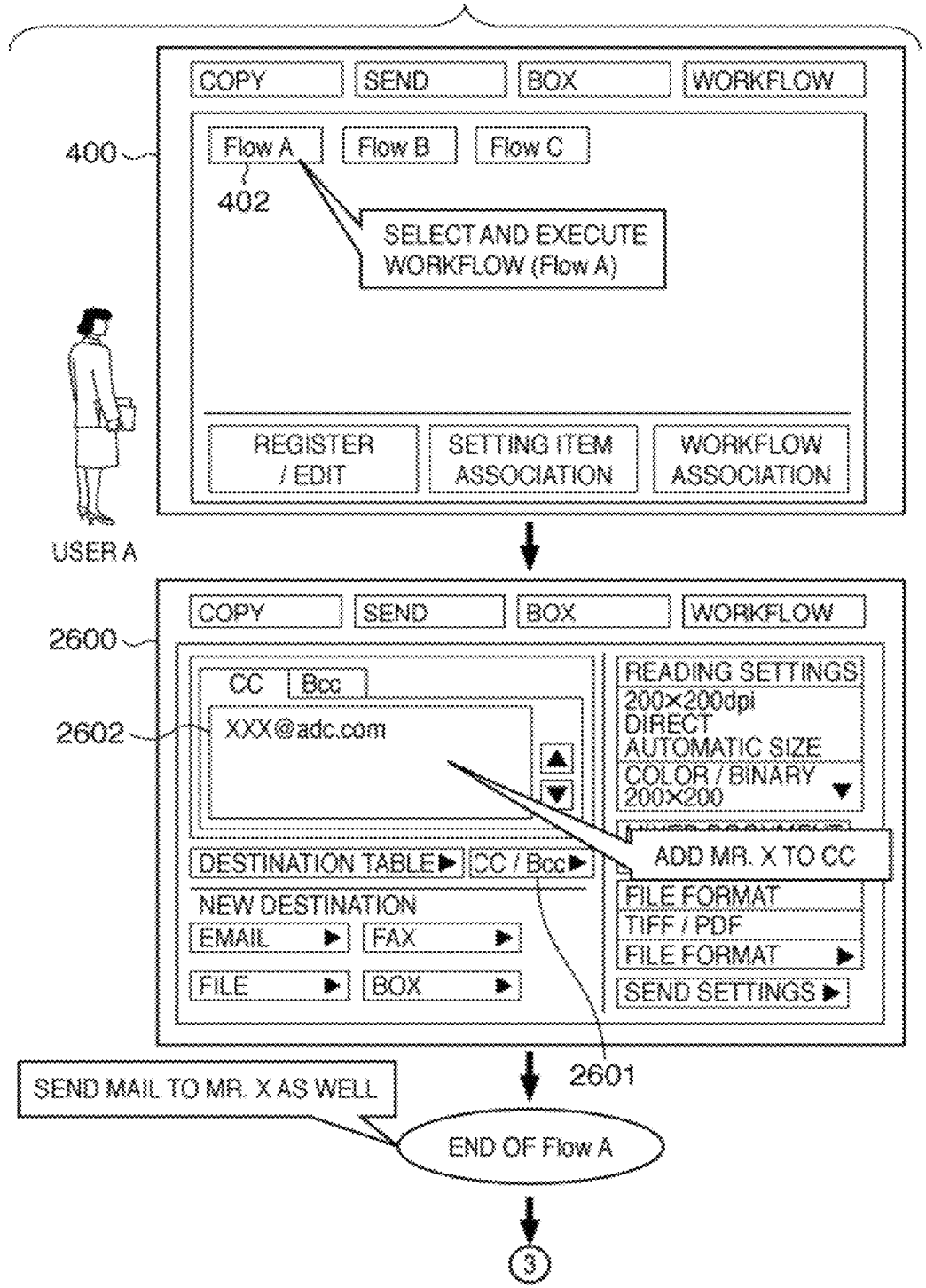
FIGS. 26A-26C are views for explaining an operation procedure when a preprocess user executes a preprocess workflow on the operation unit of an image forming apparatus according to the second embodiment.
Figure 26B:
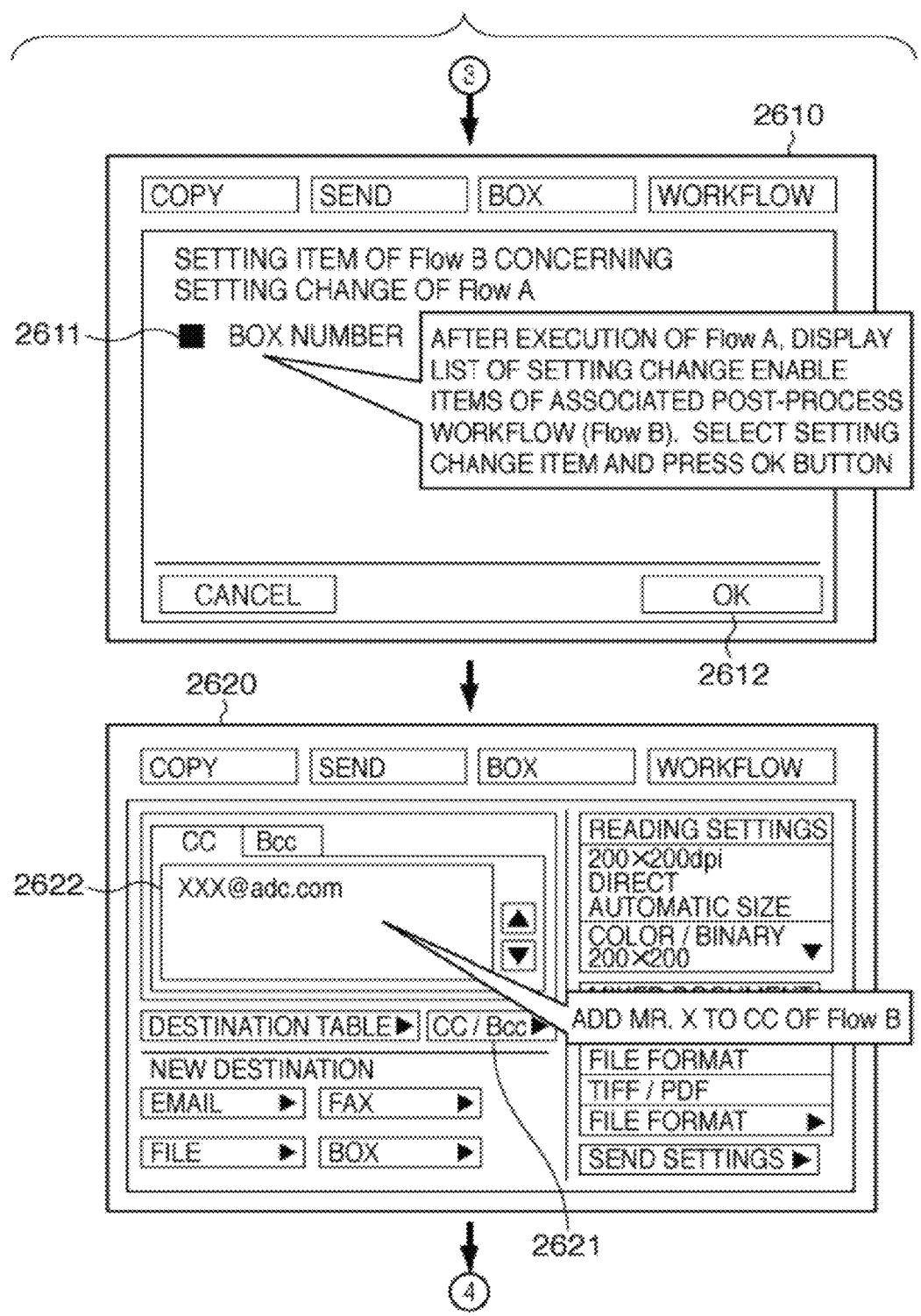
Figure 26C:
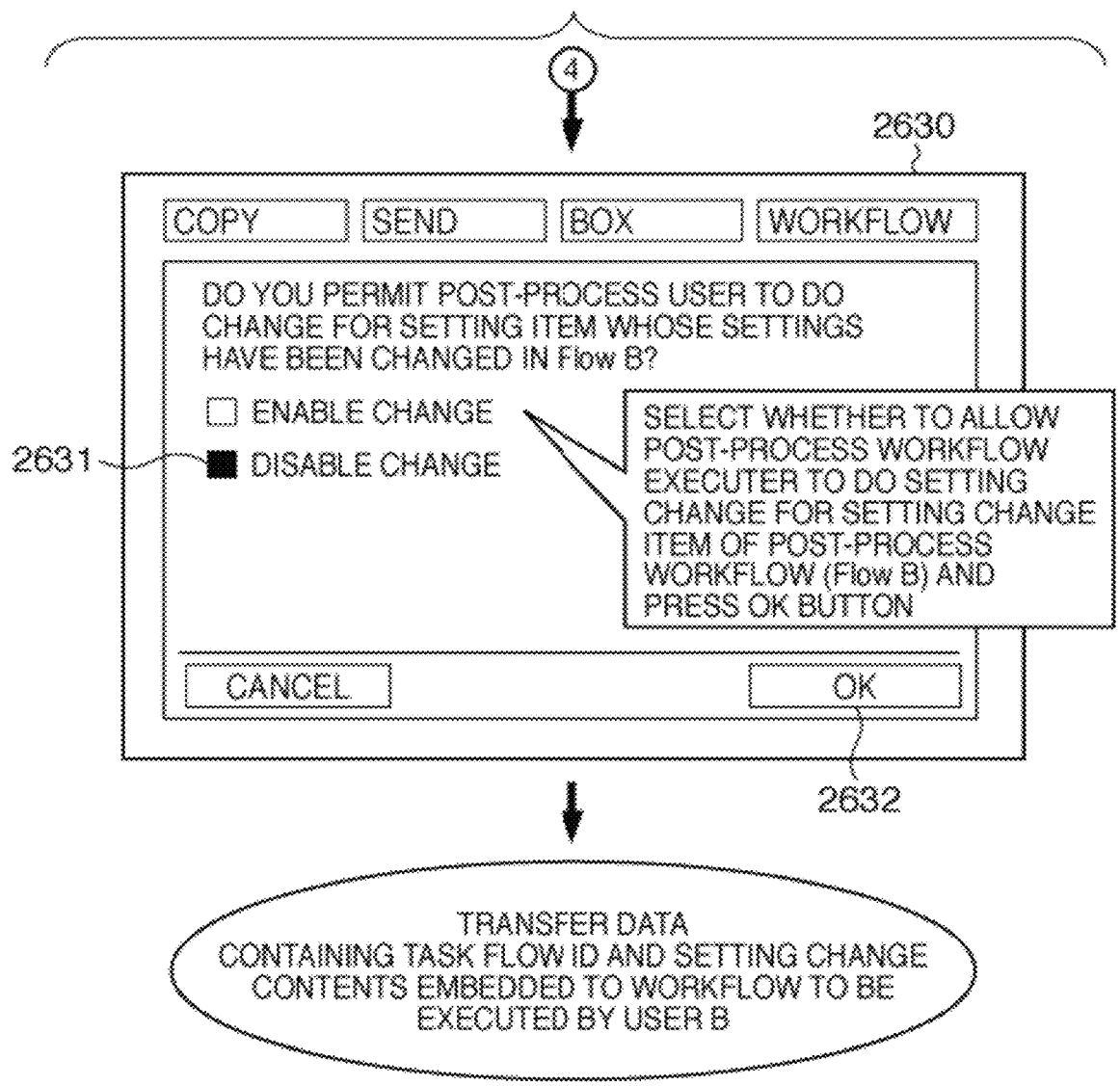

FIGS. 26A-26C are views for explaining an operation procedure when a preprocess user executes a preprocess workflow on an operation unit 1303 of an image forming apparatus 1101-X. Assume that following setting items (1) and (2) are associated with each other.

(1) A setting item "sending destination mail address" of a work item "send" of a preprocess workflow "Flow A"

(2) A setting item "sending destination mail address" of a work item "send" of a post-process workflow "Flow B"

When user A who is in charge of the preprocess workflow presses, on a workflow management window 400, a button ("Flow A" workflow execution button 402 in FIG. 26A) corresponding to a workflow to be executed, the workflow is executed. For example, on a sending destination setting window 2600 which is a window displayed during workflow execution, user A presses a CC/Bcc button 2601 and inputs Mr. X's mail address "XXX@adb.com" to add the email address for CC.

As a result, Mr. X's mail address "XXX@adb.com" is displayed in a destination list 2602 on the sending destination setting window 2600. The preprocess workflow "Flow A" is directly executed and ended. When the preprocess workflow "Flow A" has ended, a setting item list window 2610 of the post-process workflow "Flow B" concerning a setting change is displayed. To change settings, user A marks a setting item check box 2611 on the setting item list window 2610 and presses an OK button 2612. Then, a sending destination setting window 2620 for the work item "send" of the post-process workflow "Flow B" is displayed. User A presses a CC/Bcc button 2621 and inputs Mr. X's mail address "XXX@adb.com" to add the email address for CC. As a result, Mr. X's mail address "XXX@adb.com" is displayed in a destination list 2622 on the sending destination setting window 2600.

Next, a confirmation window 2630 to confirm whether to enable updating of the setting change is displayed. A setting change item display unit 1405 receives, via the confirmation window 2630, a designation to permit or prohibit to further change the contents of the setting change concerning execution of the post-process workflow. User A selects on the confirmation window 2630 whether to permit a change, marks the corresponding option (marks a change disable check box 2631 in FIG. 26C), and presses an OK button 2632. On the confirmation window shown in FIG. 26C, "disable change" is set to prohibit any setting change.

Upon setting the change disable check box 2631, information to permit or prohibit a change of the setting change contents is generated, embedded in intermediate data (transfer data), and transferred to the post-process workflow. On the confirmation window shown in FIG. 26C, "disable change" is set to prohibit any setting change. Hence, a change disable setting to prohibit any setting change is embedded in intermediate data (transfer data) as information representing the contents of the setting change and transferred to the post-process workflow.

Figure 27:
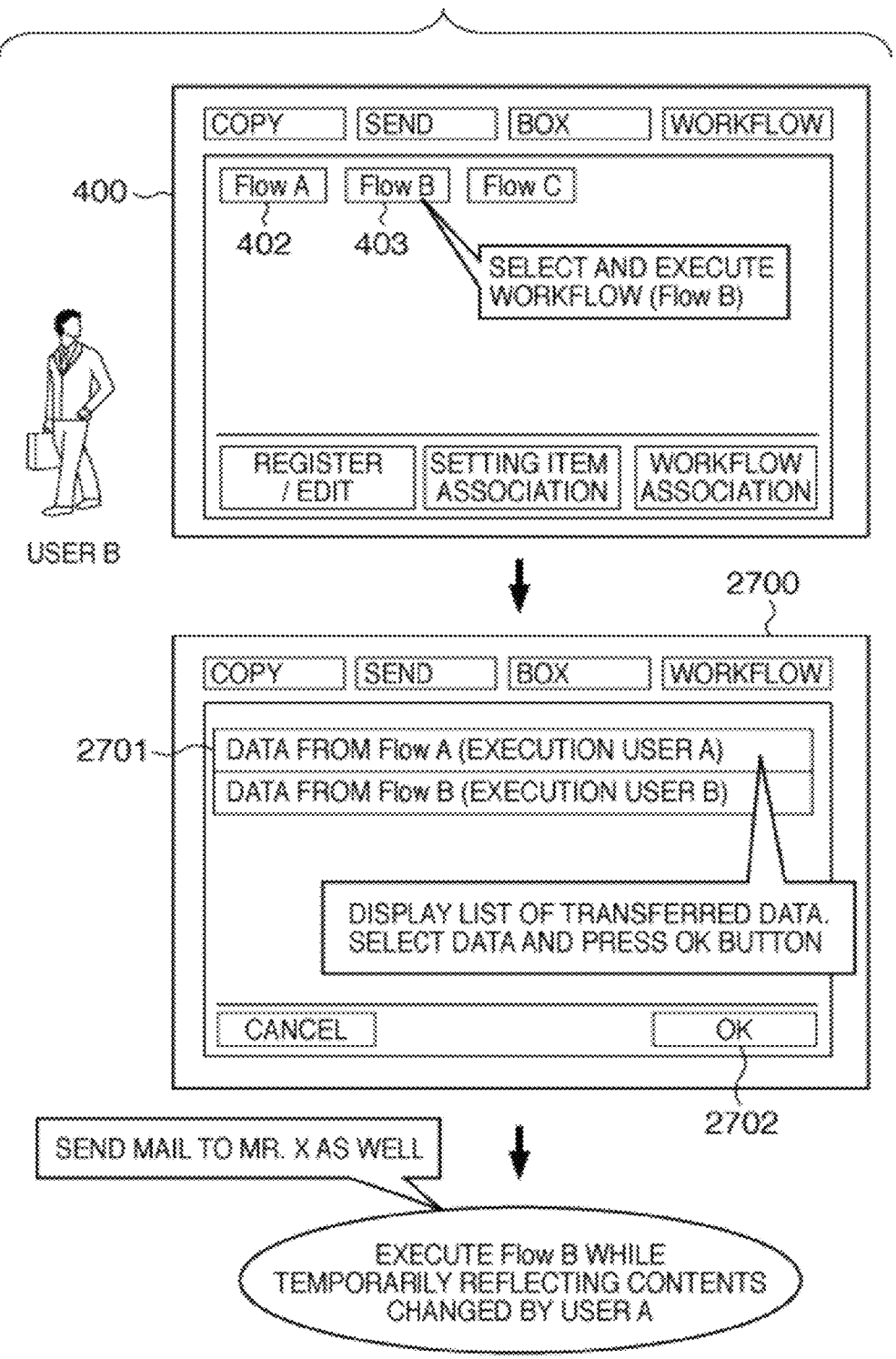
FIG. 27 is a view for explaining an operation procedure when a user executes a post-process workflow on the operation unit of the image forming apparatus according to the second embodiment.

FIG. 27 is a view for explaining an operation procedure when a user executes a post-process workflow on the operation unit 1303 of the image forming apparatus 1101-X.

A post-process data analysis unit 1407 analyzes the contents of the designation, included in the intermediate data, to permit or prohibit to further change the contents of the setting change when executing the post-process workflow.

If the analysis result of the post-process data analysis unit 1407 indicates permission of a setting change, a workflow execution unit 1409 receives the setting change in the post-process and executes the post-process workflow. If the analysis result of the post-process data analysis unit 1407 indicates prohibition of a change, the workflow execution unit 1409 executes the post-process workflow without receiving any setting change in the post-process.

User B who is in charge of the post-process workflow presses, on the workflow management window 400, a button ("Flow B" workflow execution button 403 in FIG. 27) corresponding to the workflow to be executed. If data transferred from the preprocess workflow exists, a preprocess workflow data list window 2700 is displayed. User B selects an arbitrary one (in FIG. 27, data 2701 from "Flow A" executed by user A) of data from the data list displayed on the preprocess workflow data list window 2700, and presses an OK button 2702. User B thus executes "Flow B" while temporarily reflecting the contents of the setting change by user A. At this time, if prohibition of any change in the contents of the setting change in the preprocess workflow is designated, as shown in FIG. 26C, user B cannot change the setting change contents of user A.

Figure 28:
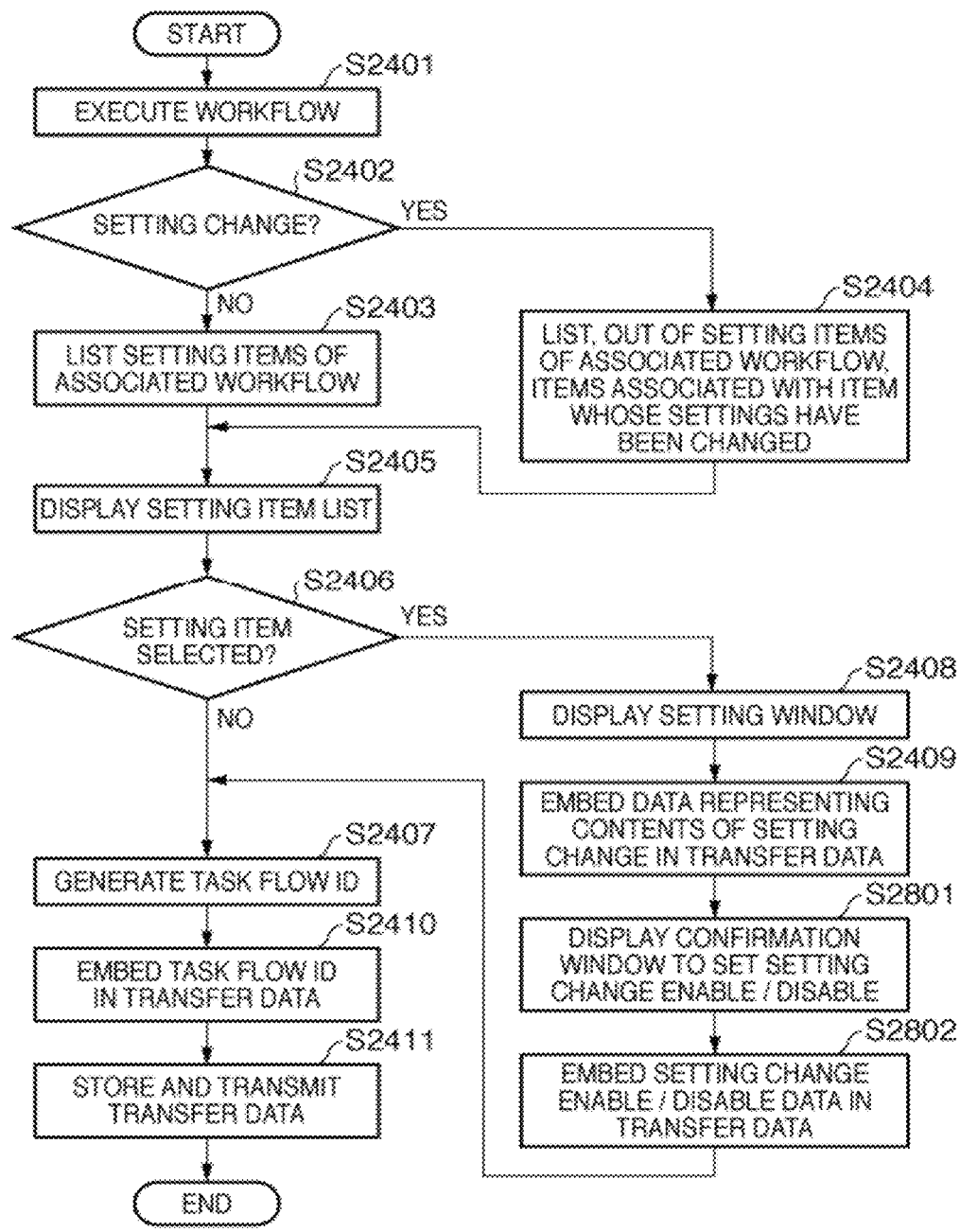
FIG. 28 is a flowchart for explaining the procedure of processing of executing the preprocess workflow of associated workflows according to the second embodiment.

FIG. 28 is a flowchart for explaining the procedure of processing of executing the preprocess workflow of associated workflows. The fundamental processing is the same as the processing described with reference to FIG. 24, and the same step numbers denote the same processes. The processing in FIG. 28 is different from that in FIG. 24 in that steps S2801 and S2802 are added. Processes in steps S2801 and S2802 will be described below.

In step S2801, the setting change item display unit 1405 displays a window for setting whether to permit (change enable) or prohibit (change disable) the person in charge of the post-process workflow to do a setting change for an item whose settings have been changed. This window corresponds to the confirmation window 2630 in FIG. 26C.

In step S2802, the setting change item display unit 1405 receives the settings on the confirmation window 2630 and notifies a preprocess data generation unit 1406 of the received information. The preprocess data generation unit 1406 embeds the setting change enable or setting change disable data in transfer data and advances the process to step S2407.

Figure 29:
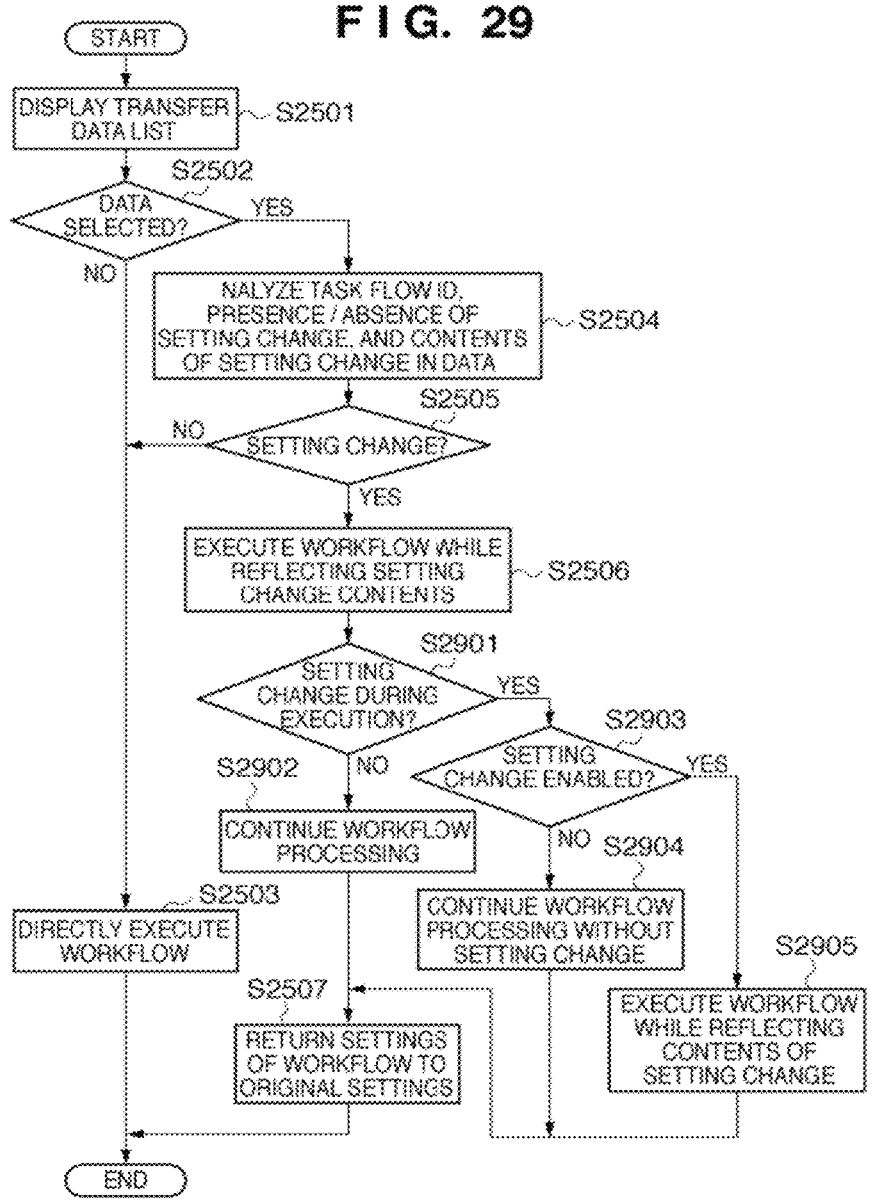
FIG. 29 is a flowchart for explaining the procedure of processing of executing the post-process workflow of associated workflows according to the second embodiment.

FIG. 29 is a flowchart for explaining the procedure of processing of executing the post-process workflow of associated workflows. The fundamental processing is the same as the processing described with reference to FIG. 25, and the same step numbers denote the same processes. The processing in FIG. 29 is different from that in FIG. 25 in that steps S2901 to S2905 are added. Processes in steps S2901 to S2905 will be described below.

In step S2901, the workflow execution unit 1409 determines whether a setting change during execution exists. If a setting change exists, the process advances to step S2903. Without any setting change, the process advances to step S2902.

Without any setting change, the workflow execution unit 1409 continues to execute the workflow in step S2902.

In step S2903, the workflow execution unit 1409 notifies the post-process data analysis unit 1407 of the existence of a setting change and the setting item as the target of the setting change. Based on the data embedded in the transfer data, the post-process data analysis unit 1407 analyzes whether the setting change in the post-process workflow is enabled or disabled for the setting item whose settings have been changed in the preprocess workflow.

If the setting change is enabled, the process advances to step S2905. If the setting change is disabled, the process advances to step S2904.

In step S2904, the post-process data analysis unit 1407 notifies the workflow execution unit 1409 that the setting change is disabled for the item which has undergone a setting change. As in the process of step S2902, the workflow execution unit 1409 continues to execute the workflow.

On the other hand, in step S2905, the post-process data analysis unit 1407 notifies the workflow execution unit 1409 that the setting change is enabled for the item which has undergone a setting change. Upon receiving this notification, the workflow execution unit 1409 reflects the contents of the setting change by the person in charge of the post-process workflow on the corresponding item and continues to execute the workflow while reflecting the setting change on it.

When executing the preprocess workflow, it is possible not only to designate whether to enable a setting change for a work item that constitutes the post-process workflow but also to designate a person in charge who can do a setting change for the post-process workflow.

In this case, the setting change item display unit 1405 receives a designation of user information to specify a user who can do a setting change for a setting item of a work item that constitutes the post-process workflow. The preprocess data generation unit 1406 includes, in the intermediate data, the user information received by the setting change item display unit 1405. The post-process data analysis unit 1407 determines whether the user information included in the intermediate data coincides with the user information of the user who executes the post-process workflow. If the two pieces of user information coincide with each other, the workflow execution unit 1409 receives the setting change in the post-process and executes the post-process workflow. If the two pieces of user information do not coincide, the workflow execution unit 1409 executes the post-process workflow without receiving the setting change in the post-process.

According to this embodiment, the person in charge of the preprocess workflow can designate whether to enable a setting change for a work item that constitutes the post-process workflow. This solves the problem of operation errors by the person in charge of the post-process workflow, which may result in a failure in applying setting contents appropriately changed by the person in charge of the preprocess workflow.

Third Embodiment

In the first embodiment, associating workflows and associating the setting items of work items are individually performed. In the third embodiment, an arrangement will be described which associates the setting items of work items in every workflow association.

Workflow association processing and work item setting item association processing of the third embodiment are basically the same as those in FIGS. 20 and 21 described in the first embodiment. However, the processes are different in the following two points.

(1) In the workflow association processing, a workflow association ID 3201 uniquely representing association between workflows is stored in a setting item association management DB 1404, as shown in FIG. 32. Workflows associated by the processing of this embodiment are specified by the identical workflow association IDs 3201.

(2) In associating the setting items of work items, work items that constitute a target workflow are obtained when obtaining a work item list.

FIGS. 30A-30C are views for explaining an operation procedure when a workflow manager or a user associates the setting items of work items in every workflow association on an operation unit 1303 of an image forming apparatus 1101-X.

Workflow association will be defined first.

The operation is the same as the operation of associating workflows in FIG. 17 before pressing an OK button 3001 on the upper row of FIG. 30A. When the OK button 3001 is pressed, a work item constitution window 3010 is displayed.

The setting items of work items that constitute the workflows are associated. An example will be explained here in which a setting item "electronic signature" of a work item "send" of a workflow "Flow A" is associated with a setting item "stamp" of a work item "print" of a workflow "Flow B".

On the work item constitution window 3010, the user selects a button (send button 3011 in FIG. 30B) corresponding to a work item including a setting item to be associated. Then, the user presses an OK button 3012 to display a work item setting item selection window 3020. On the work item setting item selection window 3020, the user marks a check box (setting item "electronic signature" 3021 in FIG. 30B) corresponding to a setting item to be associated. The user then presses an OK button 3022 to display a work item constitution window 3030 of the workflow of the next process.

On the work item constitution window 3030, the user selects a button (print button 3031 in FIG. 30C) corresponding to a work item including a setting item to be associated. Then, the user presses an OK button 3032 to display a work item setting item selection window 3040. On the work item setting item selection window 3040, the user marks a check box (setting item "stamp" 3041 in FIG. 30C) corresponding to a setting item to be associated. To associate another setting item, the user presses a next setting item association button 3042. When the user presses the next setting item association button 3042, the work item constitution window 3010 for the preprocess workflow is displayed to enable setting. To end setting item association, the user presses an end button 3043.

Associating setting items in accordance with the operation procedure shown in FIGS. 30A-30C enables setting item association as shown in FIG. 31. In FIG. 31, the setting item "electronic signature" of the work item "send (send mail)" of the workflow "Flow A" and the setting item "stamp" of the work item "print (print setting)" of the workflow "Flow B" are associated with each other. Additionally, a setting item "storage destination box (BOX)" of a work item "box" of the workflow "Flow A" and a setting item "moving source box (BOX)" of a work item "move box" of the workflow "Flow B" are associated with each other. Furthermore, a setting item "sending destination mail address" of the work item "send (send mail)" of the workflow "Flow A" and a setting item "sending destination mail address" of the work item "send (send mail)" of the workflow "Flow B" are associated with each other.

According to this embodiment, it is possible to associate the setting items of work items in every workflow association.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-265709, filed Oct. 14, 2008, which is hereby incorporated by reference herein in its entirety.

What is claimed is:

1. An image forming apparatus for defining each of a plurality of executable functions as one work item and executing a plurality of workflows by combining work items, the apparatus comprising:
   a processor coupled to a memory, cooperating to function as:
   a setting item association unit that designates a setting item to execute a function corresponding to a work item and associates the designated setting item with a plurality of work items;
   a workflow association unit that designates, in a plurality of workflows registered in advance as executable workflows, a pre-process workflow to be executed first and a post-process workflow to be executed based on an execution result of the pre-process workflow, thereby associating the pre-process workflow with the post-process workflow;
   a setting change reception unit that receives a setting change for a setting item of a work item that constitutes the pre-process workflow and that reflects contents of the setting change on a setting item of a work item that constitutes the post-process workflow, wherein the setting items of the pre-process workflow and the post-process workflow are associated by the setting item association unit;
   a data generation unit that generates data including the execution result of the pre-process workflow and the contents of the setting change received by the setting change reception unit;
   an analysis unit that analyzes, based on the data generated by the data generation unit, whether a setting change has been done for the setting item of the work item that constitutes the post-process workflow; and
   a workflow execution unit that controls execution of the post-process workflow based on an analysis result of the analysis unit.

2. The apparatus according to claim 1, wherein, if it is determined, based on the analysis result of the analysis unit, that the setting change has been done for the setting item of the work item that constitutes the post-process workflow, the workflow execution unit executes the post-process workflow while reflecting the setting change.

3. The apparatus according to claim 1, wherein, if the pre-process workflow is executed a plurality of times, the data generation unit generates a plurality of data corresponding to a plurality of execution results.

4. The apparatus according to claim 3, further comprising a selection unit that selects one data to be used to execute the post-process workflow from the plurality of data generated by executing the pre-process workflow a plurality of times.

5. The apparatus according to claim 1, wherein
   the setting change reception unit receives a designation to permit or prohibit further change to the contents of the setting change regarding execution of the post-process workflow,
   the data generation unit includes, in the data, contents of the designation received by the setting change reception unit,
   the analysis unit analyzes the contents of the designation included in the data,
   if a change is permitted based on the analysis result of the analysis unit, the workflow execution unit receives the setting change in the post-process workflow and executes the post-process workflow, and,
   if a change is prohibited based on the analysis result of the analysis unit, the workflow execution unit executes the post-process workflow without receiving the setting change in the post-process workflow.

6. The apparatus according to claim 1, wherein
   the setting change reception unit receives a designation of user information to specify a user who can change the contents of the setting change for the setting item of the work item that constitutes the post-process workflow,
   the data generation unit includes, in the data, the user information received by the setting change reception unit,
   the analysis unit determines whether the user information included in the data coincides with a second user information of a user who executes the post-process workflow,
   if the user information and the second user information coincide with each other, the workflow execution unit receives the setting change in the post-process workflow and executes the post-process workflow, and
   if the user information and the second user information do not coincide, the workflow execution unit executes the post-process workflow without receiving the setting change in the post-process workflow.

7. A method of controlling an image forming apparatus for defining each of a plurality of executable functions as one work item and executing a plurality of workflows by combining work items, the method comprising steps of:
   designating a setting item to execute a function corresponding to a work item;
   associating the designated setting item with a plurality of work items;
   designating, in a plurality of workflows registered in advance as executable workflows, a pre-process workflow to be executed first and a post-process workflow to be executed based on an execution result of the pre-process workflow, thereby associating the pre-process workflow with the post-process workflow;

receiving a setting change for a setting item of a work item that constitutes the pre-process workflow and reflecting contents of the setting change on a setting item of a work item that constitutes the post-process workflow, wherein the setting items of the pre-process workflow and the post-process workflow are associated in the associating step;

generating data including the execution result of the pre-process workflow and the contents of the setting change reflected in the receiving step;

analyzing, based on the data generated in the generating step, whether a setting change has been done for the setting item of the work item that constitutes the post-process workflow; and controlling execution of the post-process workflow based on an analysis result in the analyzing step.

8. The method according to claim 7, wherein, in the controlling step, the post-process workflow is executed while reflecting the setting change, if it is determined, based on the analysis result in the analyzing step, that the setting change has been done for the setting item of the work item that constitutes the post-process workflow.

9. The method according to claim 7, wherein, in the generating step, if the pre-process workflow is executed a plurality of times, a plurality of data corresponding to a plurality of execution results are generated.

10. The method according to claim 9, further comprising a step of selecting one data to be used to execute the post-process workflow from the plurality of data generated by executing the pre-process workflow a plurality of times.

11. The method according to claim 7, wherein
in the receiving step, a designation to permit or prohibit further change to the contents of the setting change regarding execution of the post-process workflow is received,
in the generating step, contents of the designation received in the receiving step are included in the data,
in the analyzing step, the contents of the designation included in the data are analyzed,
in the controlling step, if a change is permitted based on the analysis result in the analyzing step, the setting change in the post-process workflow is received, and the post-process workflow is executed, and,
in the controlling step, if a change is prohibited based on the analysis result in the analyzing step, the post-process workflow is executed without receiving the setting change in the post-process workflow.

12. The method according to claim 7, wherein,
in the receiving step, a designation of user information to specify a user who can change the contents of the setting change for the setting item of the work item that constitutes the post-process workflow is received,
in the generating step, the user information received in the receiving step is included in the data,
in the analyzing step, it is determined whether the user information included in the data coincides with a second user information of a user who executes the post-process workflow,
in the controlling step, if the user information and the second user information coincide with each other, the setting change in the post-process workflow is received, and the post-process workflow is executed, and
in the controlling step, if the user information and the second user information do not coincide, the post-process workflow is executed without receiving the setting change in the post-process workflow.

13. The method of claim 7, wherein the steps are performed by a programmed computer.

14. A non-transitory computer-readable storage medium storing a program that when executed causes a computer to perform a control method of an image forming apparatus, the method comprising steps of:

designating a setting item to execute a function corresponding to a work item;

associating the designated setting item with a plurality of work items;

designating, in a plurality of workflows registered in advance as executable workflows, a pre-process workflow to be executed first and a post-process workflow to be executed based on an execution result of the pre-process workflow, thereby associating the pre-process workflow with the post-process workflow;

receiving a setting change for a setting item of a work item that constitutes the process workflow and reflecting contents of the setting change on a setting item of a work item that constitutes the post-process workflow, wherein the setting items of the pre-process workflow and the post-process workflow are associated in the associating step;

generating data including the execution result of the pre-process workflow and the contents of the setting change reflected in the receiving step;

analyzing, based on the data generated in the generating step, whether a setting change has been done for the setting item of the work item that constitutes the post-process workflow; and controlling execution of the post-process workflow based on an analysis result in the analyzing step.

\* \* \* \* \*